(12) United States Patent
Albrecht et al.

(10) Patent No.: US 10,534,373 B2
(45) Date of Patent: Jan. 14, 2020

(54) APPARATUS AND METHOD FOR LOCATIONAL AIMING OF AN OVERHEAD DIRECTIONAL SERVICE UNIT

(71) Applicant: The Boeing Company, Chicago, IL (US)

(72) Inventors: Mark Albrecht, Lake Stevens, WA (US); Jeffrey R. Dempsey, Mount Pleasant, SC (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 15/646,656

(22) Filed: Jul. 11, 2017

(65) Prior Publication Data
US 2019/0018429 A1    Jan. 17, 2019

(51) Int. Cl.
| | | |
|---|---|---|
| *G05D 3/12* | (2006.01) |
| *G01B 11/27* | (2006.01) |
| *B64D 11/00* | (2006.01) |
| *B64D 13/06* | (2006.01) |
| *B64D 13/00* | (2006.01) |

(52) U.S. Cl.
CPC .............. *G05D 3/12* (2013.01); *B64D 11/00* (2013.01); *B64D 13/06* (2013.01); *G01B 11/27* (2013.01); *B64D 2011/0053* (2013.01); *B64D 2013/003* (2013.01)

(58) Field of Classification Search
CPC ............. G01B 11/27; G05D 3/00; G05D 3/12
USPC .......................................................... 33/286
See application file for complete search history.

(56) References Cited

U.S. PATENT DOCUMENTS

| | | | | |
|---|---|---|---|---|
| 685,455 A | * | 10/1901 | Kinkead | G01C 15/004 33/286 |
| 3,612,949 A | * | 10/1971 | Becraft | G01C 5/00 356/153 |
| 5,450,148 A | | 9/1995 | Shu et al. | |
| 6,107,110 A | | 8/2000 | Glogovsky | |
| 6,124,935 A | * | 9/2000 | Matthews | G01C 15/008 33/286 |
| 6,510,615 B1 | * | 1/2003 | Budd | G01B 11/26 33/286 |
| 6,643,019 B1 | * | 11/2003 | Jeanneret | G01C 15/105 33/286 |
| 7,467,474 B1 | * | 12/2008 | Statham | G01B 11/272 33/286 |
| 7,748,127 B1 | * | 7/2010 | Cosimano | G01C 15/002 33/286 |

(Continued)

*Primary Examiner* — Christopher W Fulton
(74) *Attorney, Agent, or Firm* — Walters & Wasylyna LLC

(57) ABSTRACT

An apparatus for locational aiming of an overhead directional service unit includes a body including a first end configured to be matingly engaged with a housing assembly of the overhead directional service unit and a second end longitudinally opposed to the first end. A light source is disposed within the body and operable to project a light beam from the second end in a direction defined by a longitudinal axis of the body. With the first end matingly engaged with the housing assembly, pivotal movement of the body about a pivot axis relative to a mounting assembly of the overhead directional service unit applies a leverage force to the housing assembly to pivotally reposition the housing assembly relative to the mounting assembly so that the housing assembly is directionally aimed toward a target location visually indicated by the light beam.

20 Claims, 19 Drawing Sheets

(56) References Cited

U.S. PATENT DOCUMENTS

| | | | | |
|---|---|---|---|---|
| 9,080,864 B1* | 7/2015 | McCarthy | ............ | G01C 15/004 |
| 9,457,907 B2 | 10/2016 | Brown et al. | | |
| 2002/0062570 A1* | 5/2002 | Palumbo, II | ......... | G01C 15/002 |
| | | | | 33/286 |
| 2002/0083603 A1* | 7/2002 | Jang | ..................... | G01C 15/002 |
| | | | | 33/281 |
| 2005/0128749 A1 | 6/2005 | Wilson et al. | | |
| 2007/0204473 A1* | 9/2007 | Dillon | ..................... | B23P 19/06 |
| | | | | 33/286 |
| 2008/0055893 A1 | 3/2008 | Au et al. | | |
| 2009/0000135 A1* | 1/2009 | Flowers, Jr. | ............. | G01C 9/20 |
| | | | | 33/286 |
| 2014/0115907 A1* | 5/2014 | Gamon | ................ | G01C 15/004 |
| | | | | 33/286 |

* cited by examiner

APPARATUS AND METHOD FOR LOCATIONAL AIMING OF AN OVERHEAD DIRECTIONAL SERVICE UNIT

FIELD

The present disclosure is generally related to aircraft passenger service units and, more particularly, to apparatuses and methods for locational aiming of an overhead directional service unit of a passenger service unit of an aircraft.

BACKGROUND

Passenger service units are found in commercial or passenger aircraft above the rows of seats and are used to provide various service functions to the passengers. Typically these service functions include reading lights, personal air outlets, illuminated display symbols, and a flight attendant call. Typically, reading lights and personal air outlets take the form of an overhead directional service unit, in which a direction a service output (e.g., light or forced airflow) of the overhead directional service unit is adjustable. The controls for these service functions are generally disposed on a service panel of the passenger service unit above the seats.

Prior to certification and delivery of the aircraft, all of the overhead directional service units may be required to be directed at a predetermined location, for example, as defined by the customer. As examples, this predetermined location may be a seat or a tray table located below the overhead directional service unit. However, manual adjustment of the overhead directional service unit into an appropriate position directed toward the predetermined location may be difficult for a variety of reasons. As an example, power to the aircraft may not be available when directional adjustment of the overhead directional service unit is performed. As another example, the seats and/or tray tables that define the predetermined location may be not installed when directional adjustment of the overhead directional service unit is performed. As a result, some of the overhead directional service units may not be in the appropriate directional position, which may then require a manual check of all of the overhead directional service units and repositioning of those that are not directed at the predetermined location.

Accordingly, those skilled in the art continue with research and development efforts in the field of aircraft certification and delivery.

SUMMARY

In an example, the disclosed apparatus for locational aiming of an overhead directional service unit, which includes a mounting assembly and a housing assembly coupled with the mounting assembly and pivotal about a pivot axis with respect to the mounting assembly, includes a body having an interior chamber and a longitudinal axis. The body includes a first end configured to be matingly engaged with the housing assembly, and a second end longitudinally opposed to the first end. The apparatus further includes a light source disposed within the interior chamber of the body and operable to project a light beam from the second end in a direction defined by the longitudinal axis of the body. With the first end of the body matingly engaged with the housing assembly to be locationally aimed, pivotal movement of the body about the pivot axis relative to the mounting assembly applies a leverage force to the housing assembly to pivotally reposition the housing assembly relative to the mounting assembly so that the housing assembly is directionally aimed toward a target location visually indicated by the light beam.

In an example, the disclosed method for locational aiming of an overhead directional service unit, which includes a mounting assembly and a housing assembly coupled with the mounting assembly and pivotal about a pivot axis with respect to the mounting assembly using an aiming apparatus, includes, with the first end of the body matingly engaged with the housing assembly to be locationally aimed, pivotally moving the body about the pivot axis relative to the mounting assembly to apply the leverage force to the housing assembly to pivotally reposition the housing assembly relative to the mounting assembly so that the housing assembly is directionally aimed toward a target location visually indicated by the light beam.

In another example, the disclosed for locational aiming of an overhead directional service unit, which includes a mounting assembly and a housing assembly coupled with the mounting assembly and pivotal about a pivot axis with respect to the mounting assembly, includes the steps of: (1) matingly engaging a first end of a body of an aiming device with the housing assembly to be locationally aimed, (2) energizing a light source of the aiming device, disposed within an interior chamber of the body, to project a light beam from a second end of the body, (3) with the first end of the body of the aiming device matingly engaged with the housing assembly, pivoting the body of the aiming device about the pivot axis relative to the mounting assembly, (4) pivotally adjusting a position the housing assembly relative to the mounting assembly by applying a leverage force to the housing assembly with the body of the aiming device, and (5) directionally aiming the light beam toward a target location to pivotally position the housing assembly at a predetermined pivotal position so that a service outlet of the housing assembly is locationally aimed at the target location.

Other embodiments of the disclosed apparatus and method will become apparent from the following detailed description, the accompanying drawings and the appended claims.

DETAILED DESCRIPTION

Figure 1:
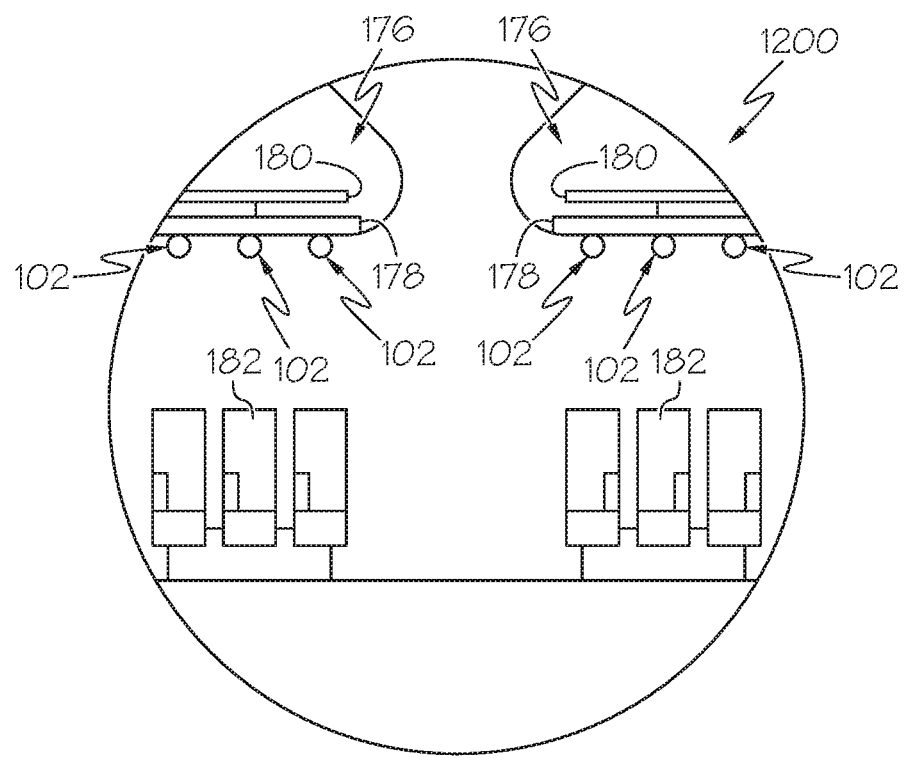
FIG. 1 is a schematic view of cabin of an aircraft.

The following detailed description refers to the accompanying drawings, which illustrate specific examples and/or embodiments described by the disclosure. Other examples and/or embodiments having different structures and/or operations do not depart from the scope of the present disclosure. Like reference numerals may refer to the same feature, element or component in the different drawings.

Illustrative, non-exhaustive examples, which may be, but are not necessarily, claimed, of the subject matter according the present disclosure are provided below.

FIG. 1 is a schematic view of an example of an interior of a cabin of a commercial aircraft 1200. A passenger service unit 176 may be positioned in the cabin of the aircraft 1200 and with respect to a seat group. FIG. 1 illustrates a plurality of overhead directional service units 102 utilized with and connected to a service panel 178. As will be described in more detail herein, the overhead directional service unit 102 may be a reading light 166 (FIG. 2), a personal air outlet 168 (FIG. 2), or an integrated (e.g., combined) reading light and personal air outlet (not explicitly illustrated).

As in the illustrative example, the overhead directional service unit 102 may be arranged directly above a corresponding passenger seat 182. Each seat 182 may include a control unit (not explicitly illustrated), for example, disposed on the service panel 178 or on the seat 182. The control unit may be configured to communicate with the overhead directional service unit 102 corresponding to the seat 182. For example, the control unit may communicate with the control board 180 of the passenger service unit 176 to control the functional service output (e.g., light and/or forced air flow) of the corresponding overhead directional service unit 102. Alternatively, the functional service output of the overhead directional service unit 102 may be controlled manually, for example, by pressing a button switch or rotating an airflow nozzle (e.g., a gasper).

Moreover, additional overhead directional service units 102 may also be located in other areas (not shown) of the cabin of the aircraft 1200. As examples, overhead directional service units 102 (e.g., reading lights 166 and/or personal air outlets 168) may also be located in crew rest areas, the flight deck, lavatories, and any other desired location.

Figure 2:
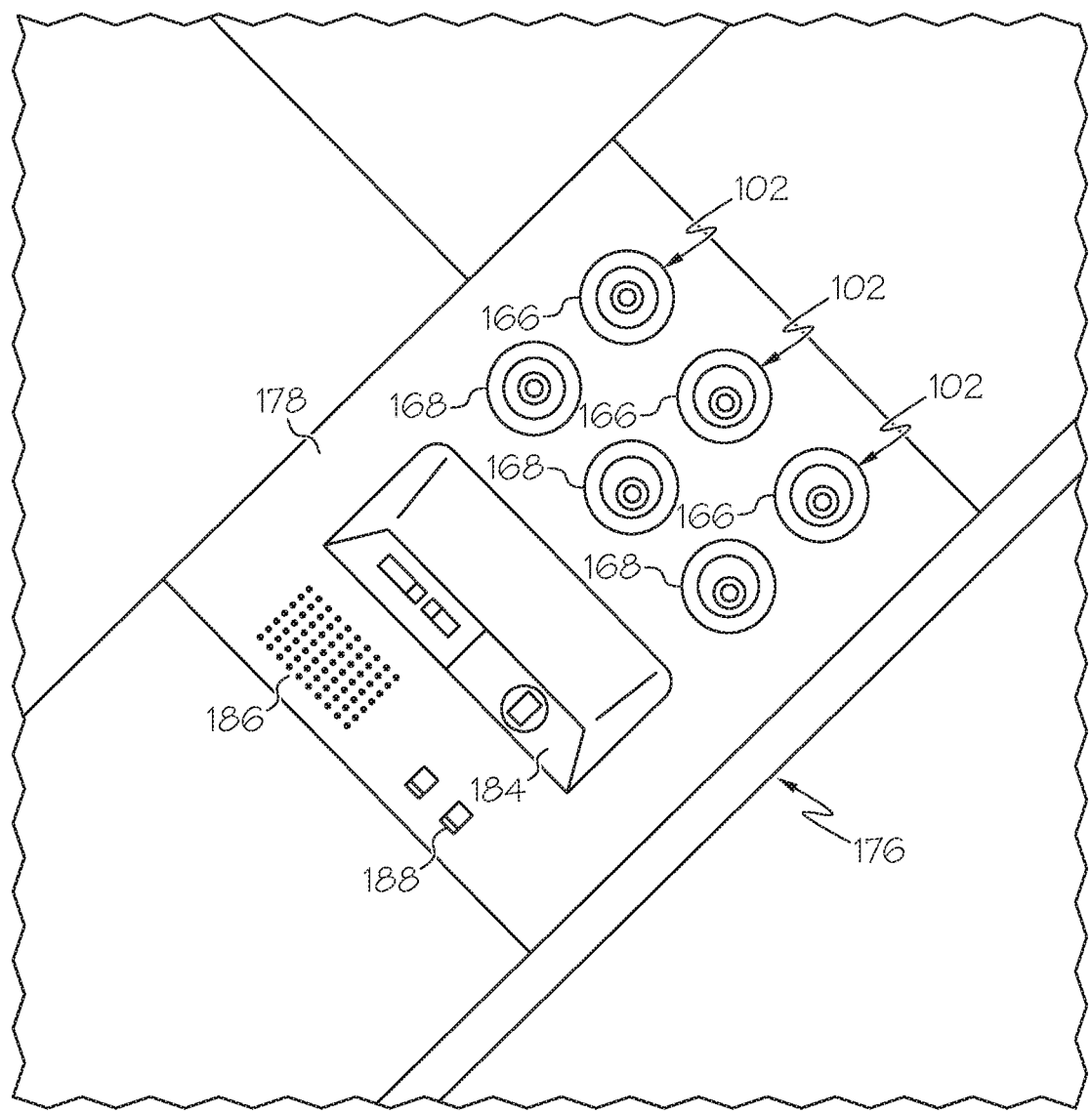
FIG. 2 is a schematic bottom view of an example passenger service unit utilized in an aircraft.

FIG. 2 is a schematic bottom view of an example of the passenger service unit 176 that may be utilized in the cabin of the commercial aircraft 1200 (FIG. 1). The bottom view illustrates a cabin-side view of the passenger service unit 176, which is available to a passenger located inside the aircraft 1200. The passenger service unit 176 may include the service panel 178 and a control board 180 (e.g., a circuit board) (FIG. 1). The service panel 178 may be positioned in front of the control board 180 on the cabin side of the aircraft 1200 for designated use and mounting of the passenger service unit 176.

Through the passenger service unit 176, a passenger is provided with a plurality of service functions based on functional electronic service units. In the example illustrated in FIG. 2, the passenger service unit 176 may include a plurality of the overhead directional service units 102 (e.g., reading lights 166, personal air outlets 168, and/or integrated reading light and personal air outlet), a plurality of display fields 184 separated from one another for the representation or display of information (e.g., fasten seatbelt indicator or restriction of mobile devices), a loud speaker 186, a plurality of service buttons 188, and the like. Each of the display field 184 may include an assigned light to illuminate the display field 184 from behind in order to highlight the symbol located on the display field 184. The speaker 186 may include an acoustic unit connected to an acoustic module arranged on the control board 180. The service buttons 188 may include a switching element arranged on the control board 180 and a switch mounted on the service panel 178. The service buttons 188 may be mechanically actuated and activated by a passenger (e.g., by pressing the service button 188). The service buttons 188 may, for example, notify the cabin crew of an emergency or a passenger need.

It should be noted that the number of components respectively included on the passenger service unit 176 may differ from the number shown in FIG. 2. For example, more or fewer overhead directional service units 102 (e.g., reading lights 166, personal air outlets 168, and/or integrated reading light and personal air outlet), service buttons 188, etc. may be provided.

Figure 3:
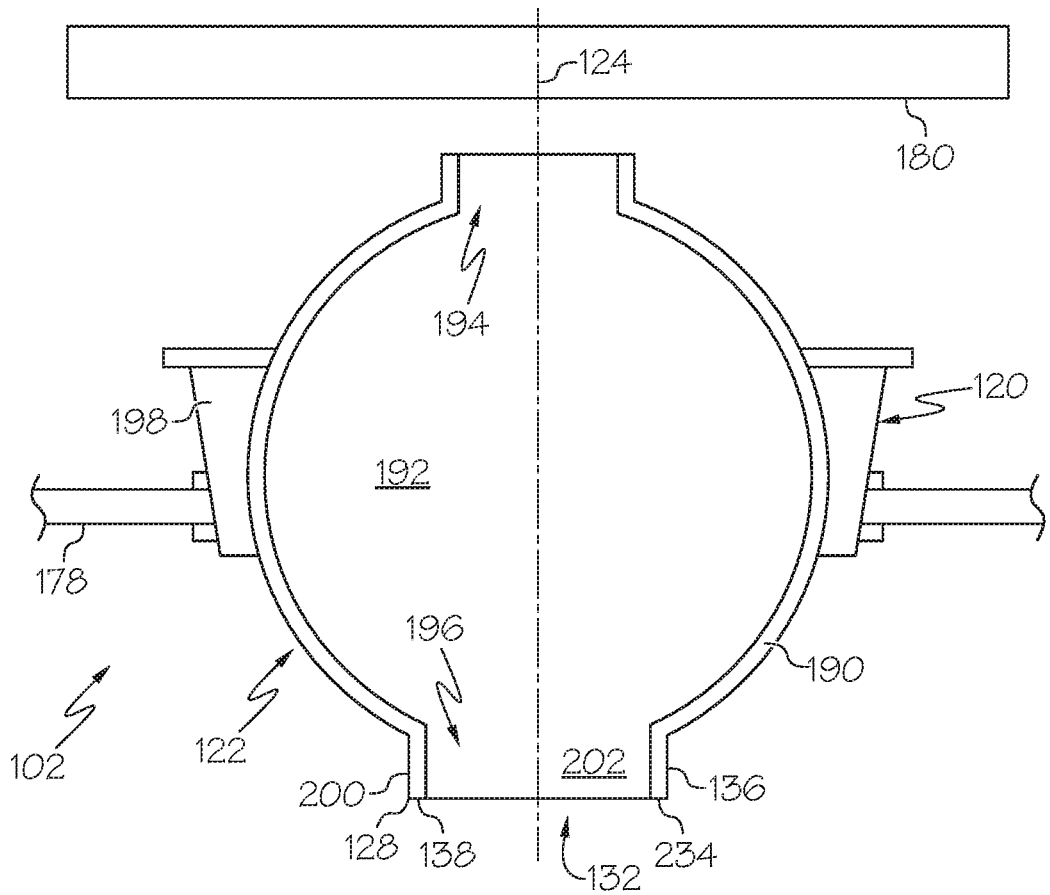
FIG. 3 is a schematic side section view of an example overhead directional service unit of the passenger service unit of FIG. 2.
Figure 4:
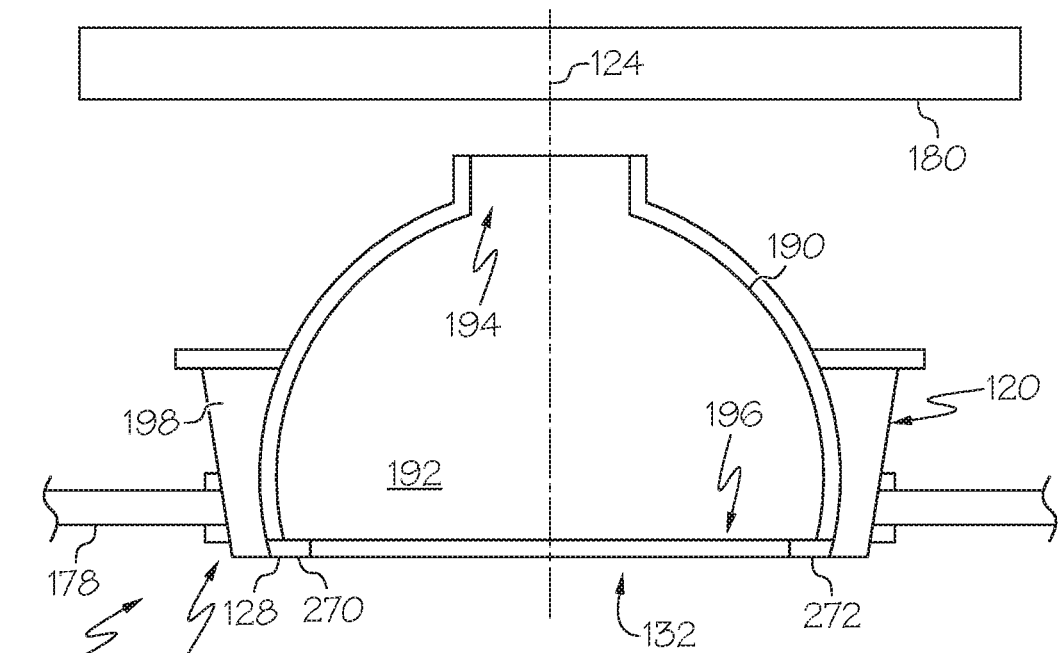
FIG. 4 is a schematic side section view of another example overhead directional service unit of the passenger service unit of FIG. 2.

FIGS. 3 and 4 are schematic side section views of examples of the disclosed overhead directional service unit 102. The overhead directional service unit 102 (e.g., the reading light 166, the personal air outlet 168, and/or the integrated reading light and personal air outlet) (FIG. 2) may provide a passenger with the ability to manually control a position of the overhead directional service unit 102 and thus a direction of the functional service output (e.g., light and/or forced air flow) delivered by the overhead directional service unit 102.

An example of the overhead directional service unit 102 includes a mounting assembly 120 and a housing assembly 122. In an example, the mounting assembly 120 is coupled with the service panel 178 in a fixed position. The housing assembly 122 is coupled (e.g., movably coupled) with the mounting assembly 120. The housing assembly 122 is pivotal about a pivot axis 124 with respect to the mounting assembly 120 to adjust a direction of the functional service output delivered from the overhead directional service unit 102.

The mounting assembly 120 may be coupled to the service panel 178 in a variety of ways. In an example, the mounting assembly 120 may include a plurality of feet extending radially outward from a base (e.g., a flange or a race) of the mounting assembly 120 and configured to hold the mounting assembly 120 in position on the service panel 178. In another example, the mounting assembly 120 may include a circumferential ridge and a snap ring to secure the mounting assembly 120 to a perimeter rim of an aperture in the service panel 178.

In an example, the housing assembly 122 may include a ball housing 190 having an interior space 192, a first opening 194 disposed at an upper (e.g., first) end of the ball housing 190, and a second opening 196 disposed at a lower (e.g., second) end of the ball housing 190. The first opening 194 is configured to connect the interior space 192 to a region above the ball housing 190 (e.g., to an interior region of the passenger service unit 176). The second opening 196 extends downward from the interior space 192 and is configured to serve as a service outlet 132 of the overhead directional service unit 102, through which the functional service output is delivered. The ball housing 190 may be formed of any suitably durable and lightweight material, such as a thermoplastic material, aluminum, an alloy, and the like.

In an example, the mounting assembly 120 may include a socket housing 198 having an inner circumferential surface suitably sized and shaped to receive the outer circumferential surface of the ball housing 190. In an example, the socket housing 198 may include an annular flange having a plurality of longitudinally extending fingers and a locking ring that encircles the flange across the tips of the fingers to hold the fingers against the outer circumferential surface of the ball housing 190. As another example, the socket housing 198 may include an annular race mounted within the service panel 178 having a partially spherical shape to provide a front hemispherical engagement with the ball housing 190. Thus, the ball housing 190 and the socket housing 198 may provide for a swivel connection for the housing assembly 122 and the mounting assembly 120.

While certain examples of the housing assembly 122 and the mounting assembly 120 are provided herein as example structural configurations of the overhead directional service unit 102, other structural configurations are also contemplated. Similarly, other pivotal connections, such as other ball-and-socket connections, are also contemplated.

As illustrated in FIG. 3, in an example, the ball housing 190 is a ball-shaped housing (e.g., having a circular cross-section in side view). In this example, a lower portion of the ball housing 190 extends beyond the socket housing 198. The housing assembly 122 also includes an outlet extension 136 extending downwardly from the ball housing 190. In an example, the outlet extension 136 includes a sidewall 200 (e.g., a continuous sidewall) coupled with the ball housing 190 and having an interior channel 202 extending the second opening 196. In this example, the outlet extension 136 serves to position the service outlet 132 of the housing assembly 122 below the mounting assembly 120 and/or the service panel 178. Thus, in this example, a contact surface 128 of the housing assembly 122 to which the disclosed apparatus 100 is matingly engaged is positioned below the mounting assembly 12 and/or the service panel 178.

As illustrated in FIG. 4, in another example, the ball housing 190 is a semi-ball-shaped housing (e.g., having a semi-circular cross-section in side view). In this example, a lower portion of the ball housing 190 is substantially flush with the socket housing 198 and/or the service panel 178). Thus, in this example, the contact surface 128 of the housing assembly 122 to which the disclosed apparatus 100 is matingly engaged is positioned proximate to (e.g., at or near) or is substantially flush with the mounting assembly 12 and/or the service panel 178.

Figure 5:
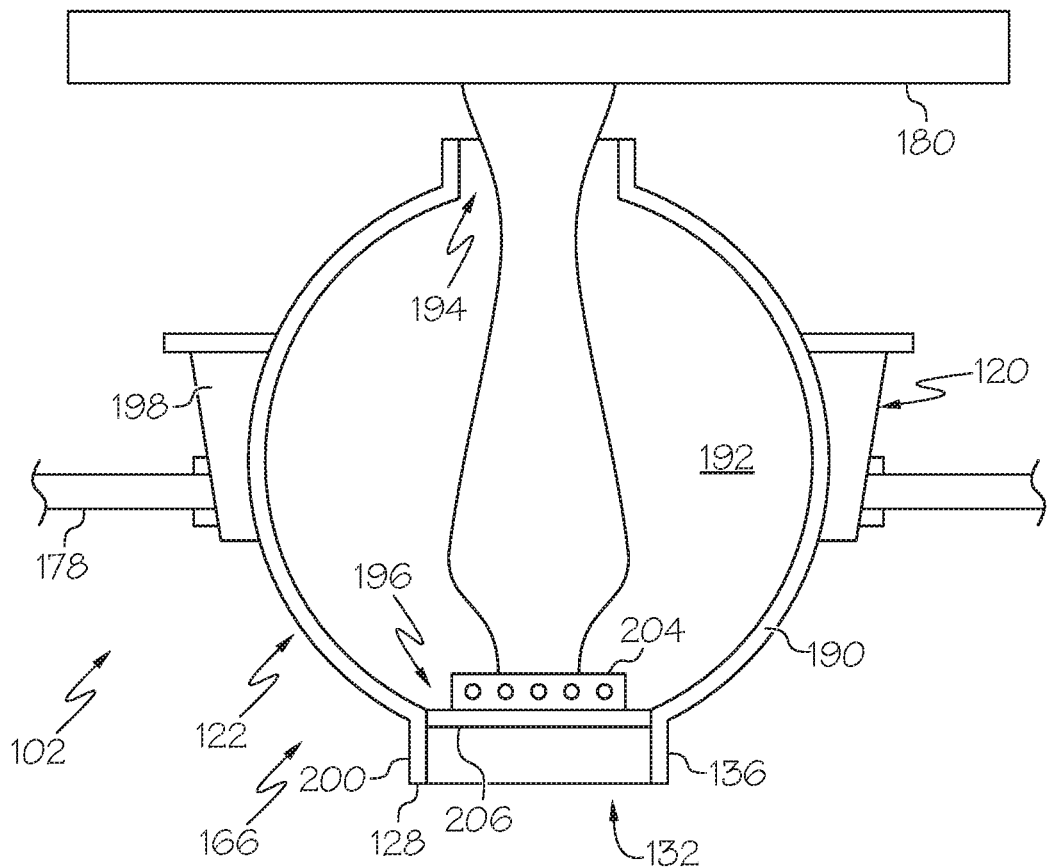
FIG. 5 is a schematic side section view of an example of the overhead directional service unit of FIG. 3 used as a reading light.
Figure 6:
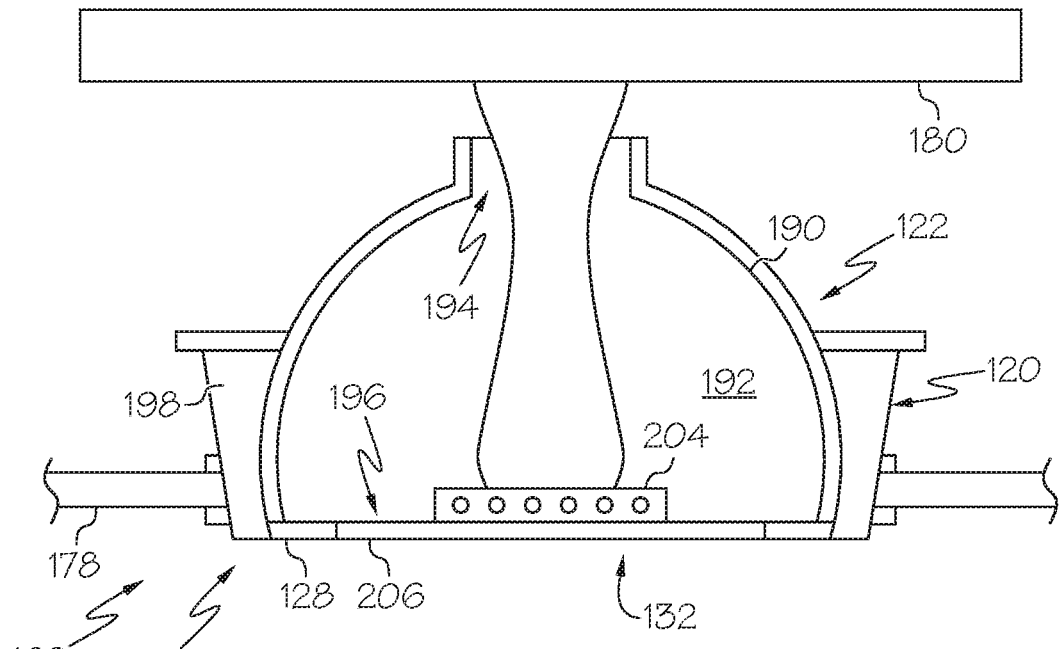
FIG. 6 is a schematic side section view of an example of the overhead directional service unit of FIG. 4 used as a reading light.

FIGS. 5 and 6 are schematic side section views of examples of the overhead directional service unit 102 configured for use as the reading light 166 (FIG. 2). In an example, the housing assembly 122 may include the light-emitting module 204 (e.g., at least one light-emitting diode) housed within the ball housing 190, for example, proximate (e.g., at or near) the lower end of the ball housing 190. An electrical circuit may be formed by connecting the light-emitting module 204 and an electric power source (not shown) of the aircraft 1200 (FIG. 1). For example, the light-emitting module 204 may include an electrical connection extending from the interior space 192 and through the first opening 194 of the ball housing 190 for connection to the electric power source. As an example, the light-emitting module 204 may be connected to the control board 180, which may also include a switch module (not shown) for illuminating the light-emitting module 204 upon receipt of an activation signal.

In an example, the light-emitting module 204 may be positioned proximate to the second opening 196 of the ball housing 190. In another example, the light-emitting module 204 may be positioned within the second opening 196 of the ball housing 190. In another example, the light-emitting module 204 may be positioned within the interior channel 202 of the outlet extension 136 of the ball housing 190. As an example, the light-emitting module 204 may be suitably sized to fit within the second opening 196 of the ball housing 190 or the interior channel 202 of the outlet extension 136. As an example, the light-emitting module 204 may include a generally circular shape, in end view, suitable to fit within a generally circular, in end view, second opening 196 of the ball housing 190 or the interior channel 202 of the outlet extension 136. Other shapes for the second opening 196 and/or the light-emitting module 204 are also contemplated, for example, square, rectangular, elliptical, triangular, or other polygons.

In an example, the housing assembly 122 may include a lens 206 disposed in front of the light-emitting module 204. As an example, the lens 206 may be connected to the housing assembly 122 over the second opening 196 of the ball housing 190. Optionally, the housing assembly 122 may also include the reflector (not shown) disposed behind the light-emitting module 204.

In an example, and as illustrated in FIG. 5, the lens 206 may be positioned within the outlet extension 136 such that at least a portion of the sidewall 200 of the outlet extension 136 extends beyond the lens 206. As an example, the lens 206 may be suitably sized to fit within the interior channel 202 of the outlet extension 136. As an example, the lens 206 may include a generally circular shape, in end view, suitable to fit within a generally circular, in end view, interior channel 202 of the outlet extension 136. Other shapes for the interior channel 202 and/or the lens 206 are also contemplated, for example, square, rectangular, elliptical, triangular, or other polygons.

In an example, and as illustrated in FIG. 6, the lens 206 may be positioned within the second opening 196 of the ball housing 190. As an example, the lens 206 may be suitably sized to fit within the second opening 196 of the ball housing 190. As an example, the lens 206 may include a generally circular shape, in end view, suitable to fit within a generally circular, in end view, second opening 196 of the ball housing 190. Other shapes for the second opening 196 and/or the lens 206 are also contemplated.

In another example (not illustrated), a collar (not shown) may house the lens 206. The collar may be removably coupled with the housing assembly 122, for example, the ball housing 190 or the outlet extension 136.

While certain examples of the overhead directional service unit 102 utilized as the reading light 166 are provided herein as example configurations of the overhead directional service unit 102, other configurations of the light-emitting module 204 and/or the lens 206 are also contemplated.

Figure 7:
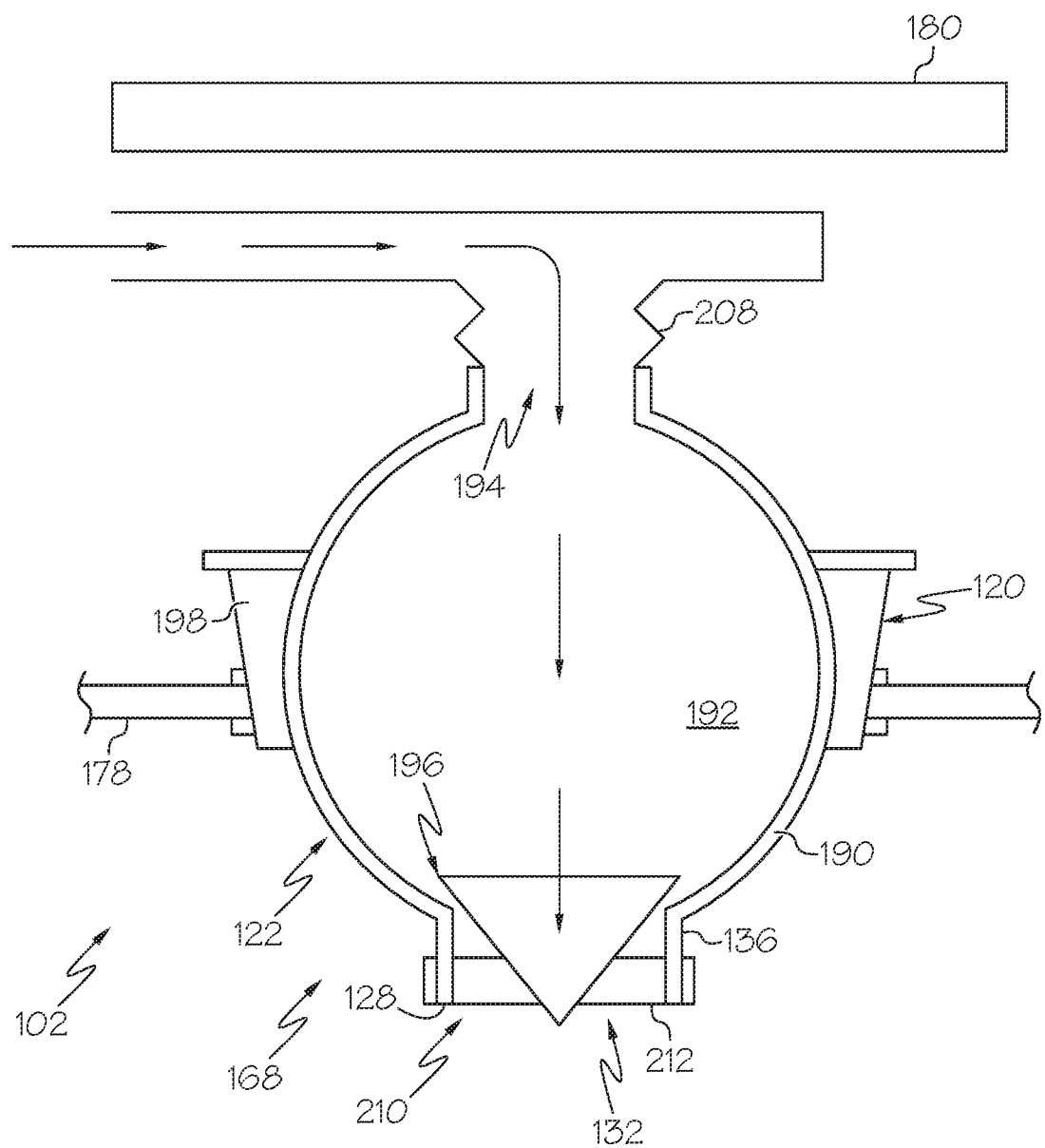
FIG. 7 is a schematic side section view of an example of the overhead directional service unit of FIG. 3 used as a personal air outlet.
Figure 8:
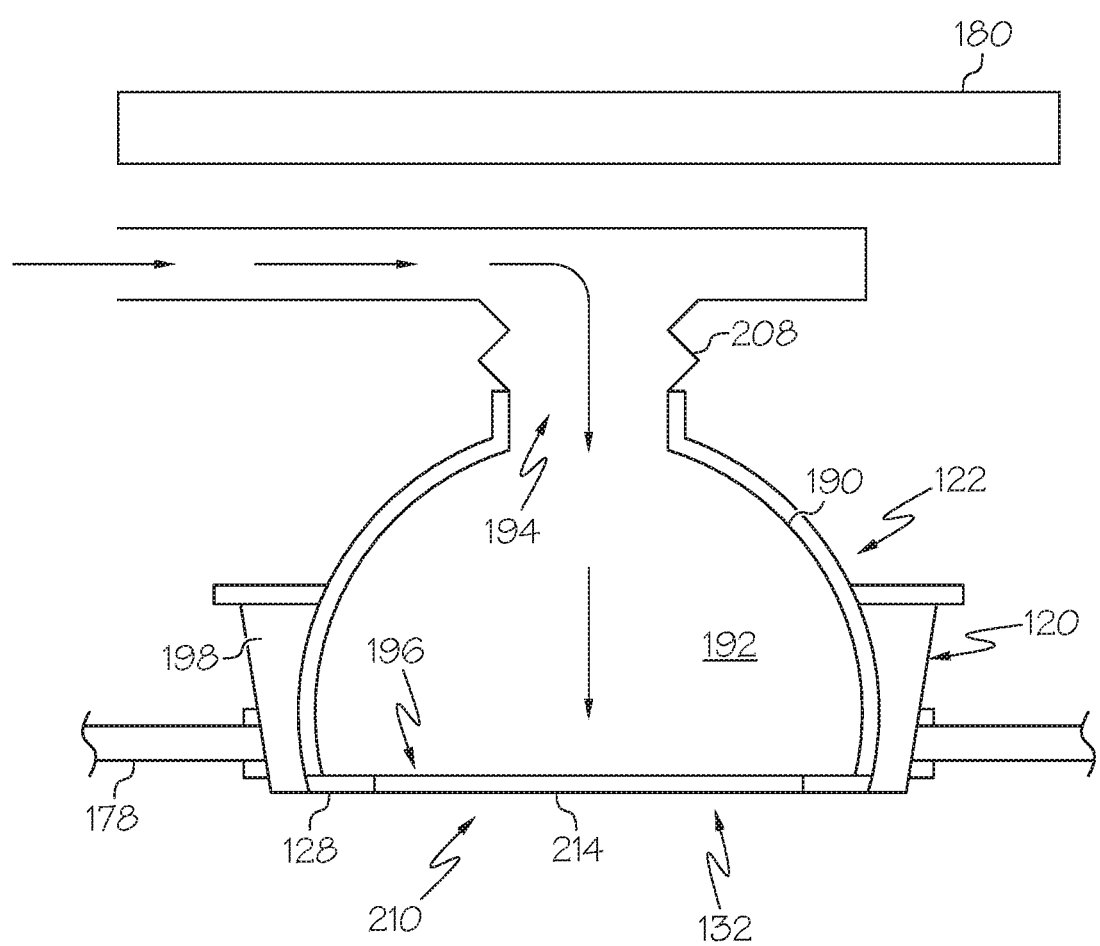
FIG. 8 is a schematic side section view of an example of the overhead directional service unit of FIG. 4 used as a personal air outlet.

FIGS. 7 and 8 are schematic side section views of examples of the overhead directional service unit 102 configured for use as the personal air outlet 168 (FIG. 2), also commonly referred to as a gasper. In an example, the housing assembly 122 may include a conduit connector 208 extending from the ball housing 190 and configured to connect an air source (not shown), such as a duct in the low pressure low volume air system contained within the passenger service unit 176 (FIG. 2). For example, the conduit connector 208 may be a flexible conduit connector to allow for rotating motion of the housing assembly 122. An airflow (denoted by arrow) may be provided from the air source through the interior space 192 of the ball housing 190 from the first opening 194 to the second opening 196.

In an example, the housing assembly 122 may also include a flow adjustment assembly 210 connected to the lower end of the ball housing 190 about the second opening 196 to adjust the airflow from the personal air outlet 168 between no air output and a fairly substantial air output.

In an example, and as illustrated in FIG. 7, the flow adjustment assembly 210 may include a nozzle assembly 212 configured to adjust the airflow exiting the service outlet 132 of the housing assembly 122. As an example, the nozzle assembly 212 may include a collar coupled with the outlet extension 136 and a plug positioned within the outlet extension and linearly movable relative to the second opening 196 between a closed position and an open position in response to rotation of the collar.

In another example, and as illustrated in FIG. 8, the flow adjustment assembly 210 may include a shutter assembly 214 configured to adjust the airflow exiting the service outlet 132 of the housing assembly 122. As an example, the shutter assembly 214 may include a plurality of blades positioned adjacent to (e.g., below) the second opening 196, for example, by connecting the shutter assembly 214 to the lower end of the ball housing 190 about the second opening 196. Each of the blades may be pivotably connected to one another, such that each blade may be successively rotated upon an adjacent blade in order to expose a larger portion of the second opening 196 of the ball housing 190, thus providing for a greater airflow.

While certain examples of the overhead directional service unit 102 utilized as the personal air outlet 168 are provided herein as example configurations of the overhead directional service unit 102, other configurations of the flow adjustment assembly 210 are also contemplated.

Figure 9:
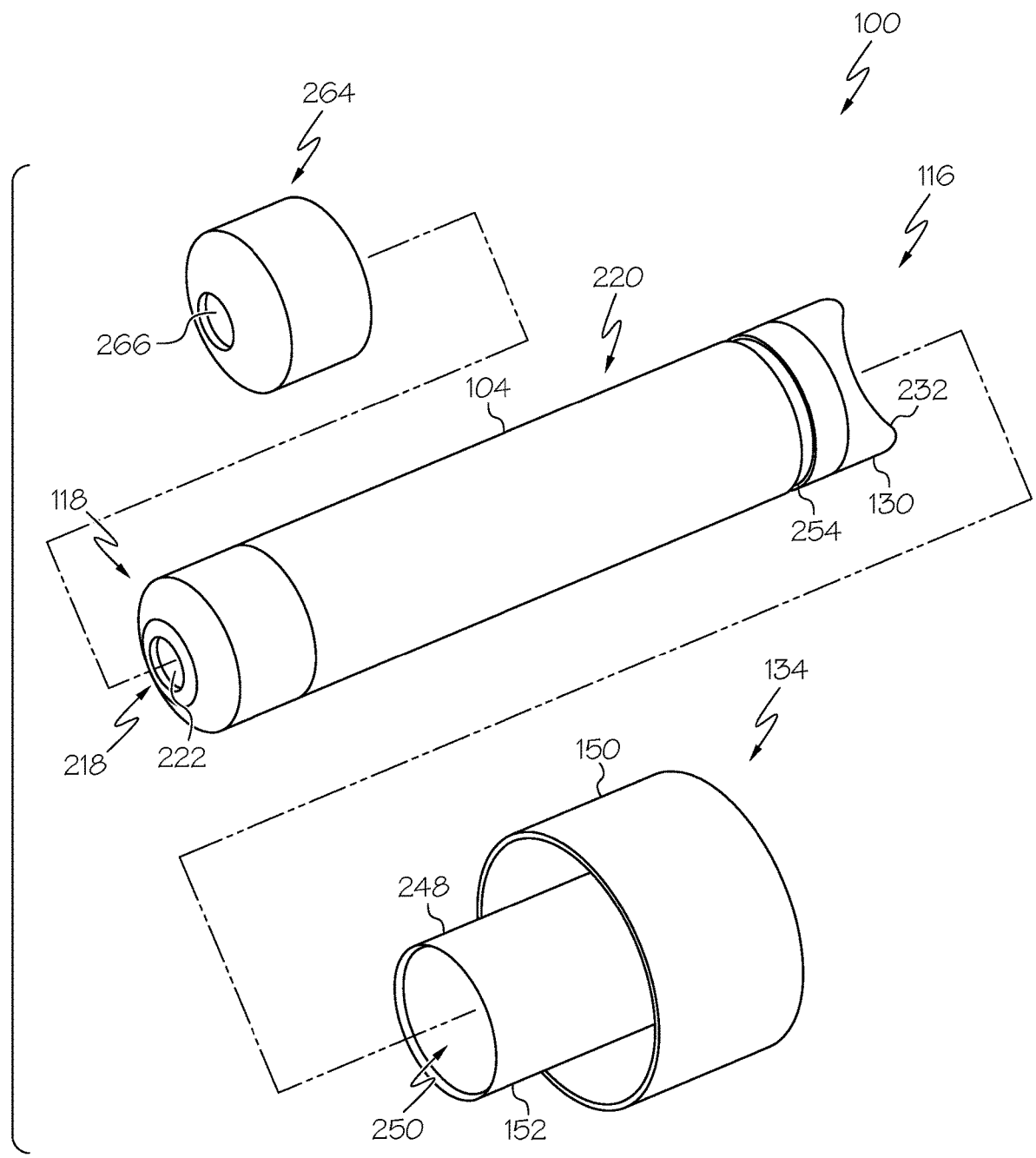
FIG. 9 is a schematic perspective view of an example of the disclosed apparatus for locational aiming of the overhead directional service unit.

FIG. 9 is a perspective view of an example of the disclosed aiming apparatus, generally referred to herein as "apparatus," 100 for locational aiming of the overhead directional service unit 102. The apparatus 100 may be used for aiming the overhead directional service unit 102 of the passenger service unit 176 by visually indicating a directional orientation of the service outlet 132 of the overhead directional service unit 102.

The apparatus 100 is configured to interface with multiple designs or structural configurations of different types of overhead directional service units 102. For example, the apparatus 100 may be configured to be used with both reading lights 166 of different styles (e.g., the different reading lights 166 illustrated in FIGS. 5 and 6) and personal air outlets 168 of different styles (e.g., the different personal air outlets 168 illustrated in FIGS. 7 and 8).

The apparatus 100 is further configured to avoid contact with interior functional components of the overhead directional service unit 102. As an example, the apparatus 100 may be configured to interface with the housing assembly 122 of the overhead directional service unit 102 used as the reading light 166 without contact with the light-emitting module 204 and/or the lens 206 (e.g., FIGS. 5 and 6). As another example, the apparatus 100 may be configured to interface with the housing assembly 122 of the overhead directional service unit 102 used as the personal air outlet 168 without contact with the flow adjustment assembly 210 (e.g., FIGS. 7 and 8).

Figure 18D:
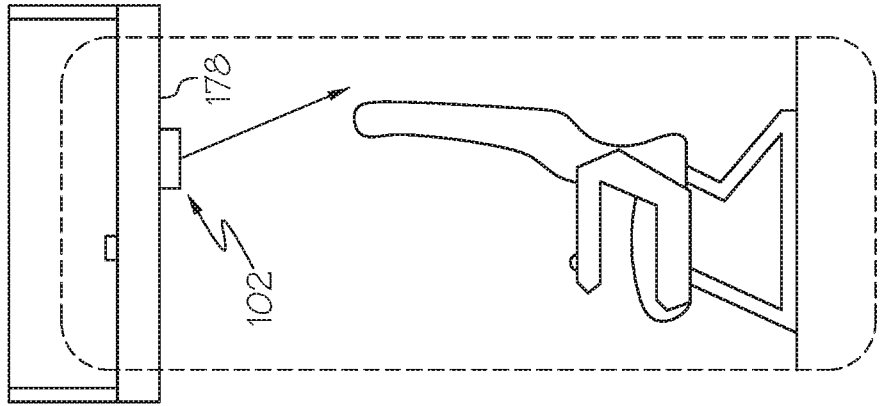
FIGS. 18A-18D are schematic illustrations of the overhead directional service unit locationally aimed at a target location.
Figure 18C:
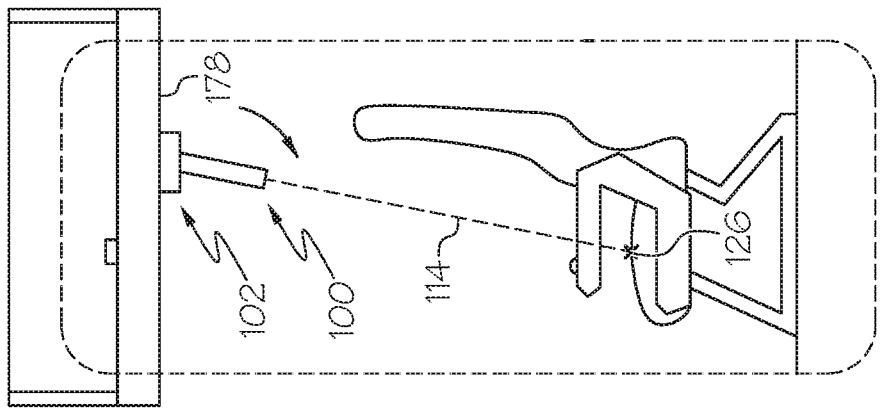
Figure 18B:
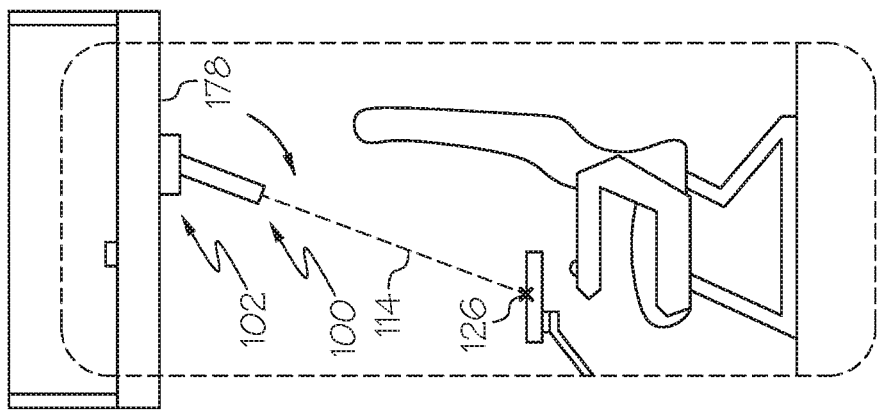

In an example, the apparatus 100 includes an aiming device 220 configured to be manually, and removably, coupled with the overhead directional service unit 102 (FIGS. 1-8) of the passenger service unit 176 (FIGS. 1 and 2). The aiming device 220 enables the functional service output (e.g., light or airflow) of the overhead directional service unit 102 to be manually aimed at a predetermined location, referred to herein as a target location 126 (FIGS. 18B-18D).

Optionally, the apparatus 100 also includes one or more adapters 134. The adapter 134 is configured to be removably coupled with the aiming device 220. The adapter 134 is further configured to be manually, and removably, coupled with the overhead directional service unit 102. The adapter 134 configured to be used as a connection interface and enables the aiming device 220 to be used in situations where the aiming device 220 cannot be directly coupled with the overhead directional service unit 102, for example, due to the size, shape, style, design or type of overhead directional service unit 102.

Figure 10:
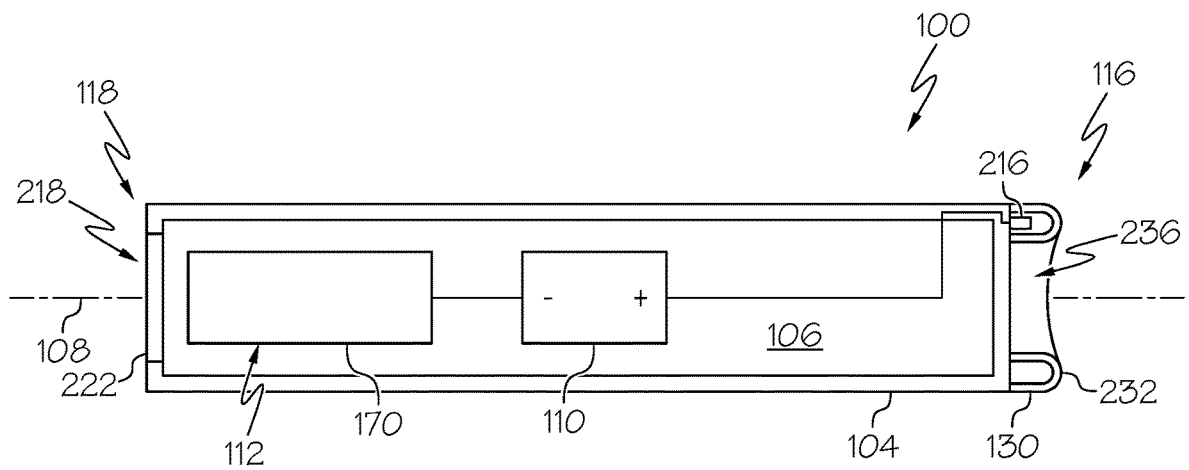
FIG. 10 is a schematic side section view of an example of the apparatus of FIG. 9.
Figure 11:
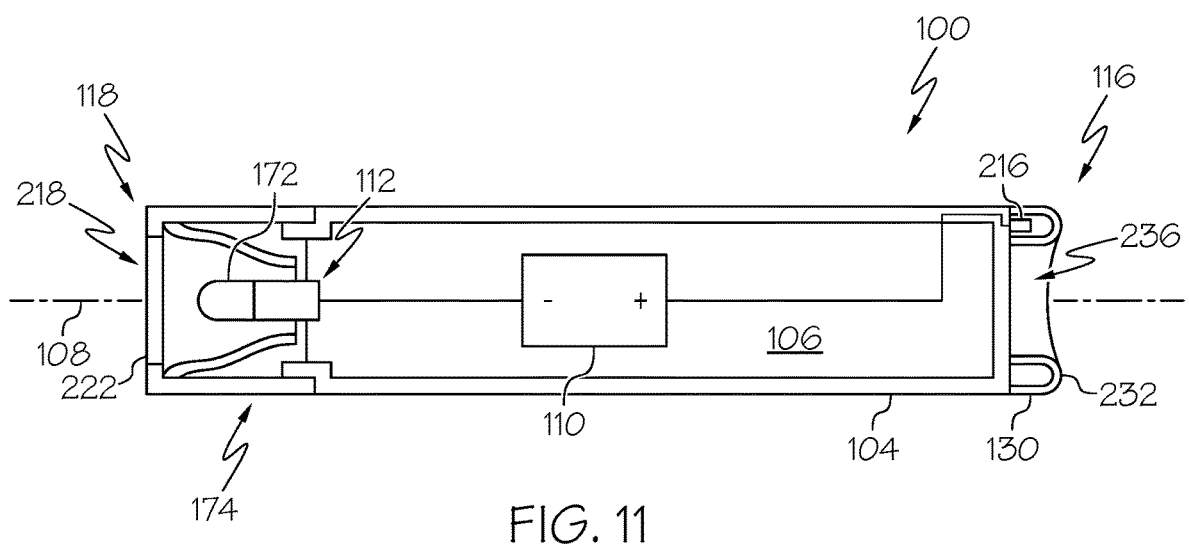
FIG. 11 is a schematic side section view of another example of the apparatus of FIG. 9.

FIGS. 10 and 11 are schematic side section views of examples of the apparatus 100 of FIG. 9. In an example, the aiming device 220 includes a body 104 having an interior chamber 106 and a longitudinal axis 108. The body 104 includes a first end 116 configured to be matingly engaged with the housing assembly 122 of the overhead directional service unit 102 (e.g., FIGS. 3-8). The body 104 also includes a second end 118 longitudinally opposed to the first end 116. The apparatus 100 also includes a light source 112 disposed within the interior chamber 106 of the body 104 and operable to project a light beam 114 (FIGS. 18B-18D) from the second end 118 in a direction defined by the longitudinal axis 108 of the body 104. The body 104 has an aperture 218 formed therethrough, preferably at its second end 118, through which the light beam 114 exits the body 104. The apparatus 100 also includes a power source 110 disposed within the interior chamber 106. The light source 112 is in electrical communication with the power source 110. The apparatus 100 also includes a switch 216 disposed on an exterior of the body 104 and configured to energize the light source 112.

The body 104 defines an exterior housing for the light source 112, the power source 110, the switch 216 and any other electrical, mechanical or functional components of aiming device 220. In an example, body 104 also includes a lens 222 that is seated within the aperture 218, which defines an optical aperture. The lens 222 may be made from a transparent material, such as clear plastic, glass, or another known optically transparent material. The body 104 may also include a power source access (not shown) to facilitate the mounting and/or dismounting of the power source 110. As an example, the power source 110 may be one or more batteries that meet the size and electrical requirements of the light source 112.

In an example, the body 104 may have a generally cylindrical shape (e.g., circular in cross-section) and a suitable length to be readily and comfortably used in one hand (e.g., ergonomic). Other shapes and/or ergonomic features of the body 104 are also contemplated. In an example, the body 104 may be made from a material that is durable against common chemicals and rigid enough to apply a leverage force to the housing assembly 122 during locational aiming of the overhead directional service unit 102, but is also soft enough to prevent damage to interior components of the aircraft, such as a polytetrafluoroethylene (PTFE) based plastic material.

As illustrated in FIG. 10, in an example, the light source 112 includes at least one laser module 170 configured to generate and project the light beam 114 (e.g., a laser beam). In an example, the laser module 170 includes a laser element (e.g., a laser diode) configured to emit coherent light of a desired color (e.g., red, green, or blue laser light), a driving circuit electronically connected to the laser element and configured to regulate power from the power source 110 and cause the laser element to emit light, and a collimating lens configured to collimate emitted light into a light beam. The light source 112 may also include other components such as lenses, mounts, wiring, and other components.

Use of the laser module 170 as the light source 112 provides certain advantages to the disclosed apparatus 100. As an example, the laser beam can eliminate focal point issues that may arise when the target location 126 (FIGS. 18B-18D) changes between different overhead directional service units 102 and/or between different aircraft. For example, a distance of the target location 126 from the apparatus 100 when coupled with the overhead directional service unit 102 may vary between approximately 24 inches (60 cm) and approximately 72 inches (182 cm). As an example, during certification of one aircraft, the target location 126 may be a seat cushion of the seat associated with the overhead directional service unit 102. During certification of another aircraft, the target location 126 may be a tray table forward of the seat associated with the overhead directional service unit 102. During certification of yet another aircraft, the target location 126 may be a floor panel or seat-mounting bracket corresponding to the seat associated with the overhead directional service unit 102. As another example, the laser module 170 may remain cool during use, which can prevent thermal damage to the overhead directional service unit 102 and other components of the interior of the aircraft. Further, the laser beam may be configured to be clearly visible in very bright locations. The laser beam may also be configured to be clearly visible to a color-blind person, for example, green or blue laser light. As examples, the laser module 170 may be a Class 1 or a Class 2 laser.

As illustrated in FIG. 11, in another example, the light source 112 includes at least one light emitting element 172 configured to generate and project the light beam 114. In an example, light emitting element 172 may include an incandescent bulb, a fluorescent bulb or, preferably, a light-emitting diode (LED). The light source 112 may also include a reflector disposed within the body 104 and a light holder movably mounted within the reflector that holds the light emitting element 172. The light source 112 may also include other components such as lenses, mounts, wiring, and other components.

In an example, the aiming device 220 may also include a focusing assembly 174 coupled with the body 104 and the light source 112 and operable to focus the light beam 114 and/or adjust the focal point of the light beam. In an example, the focusing assembly may include interoperable components configured to linearly move the light holder (and the light emitting element 172 coupled with the light holder) relative to the reflector.

Figure 12:
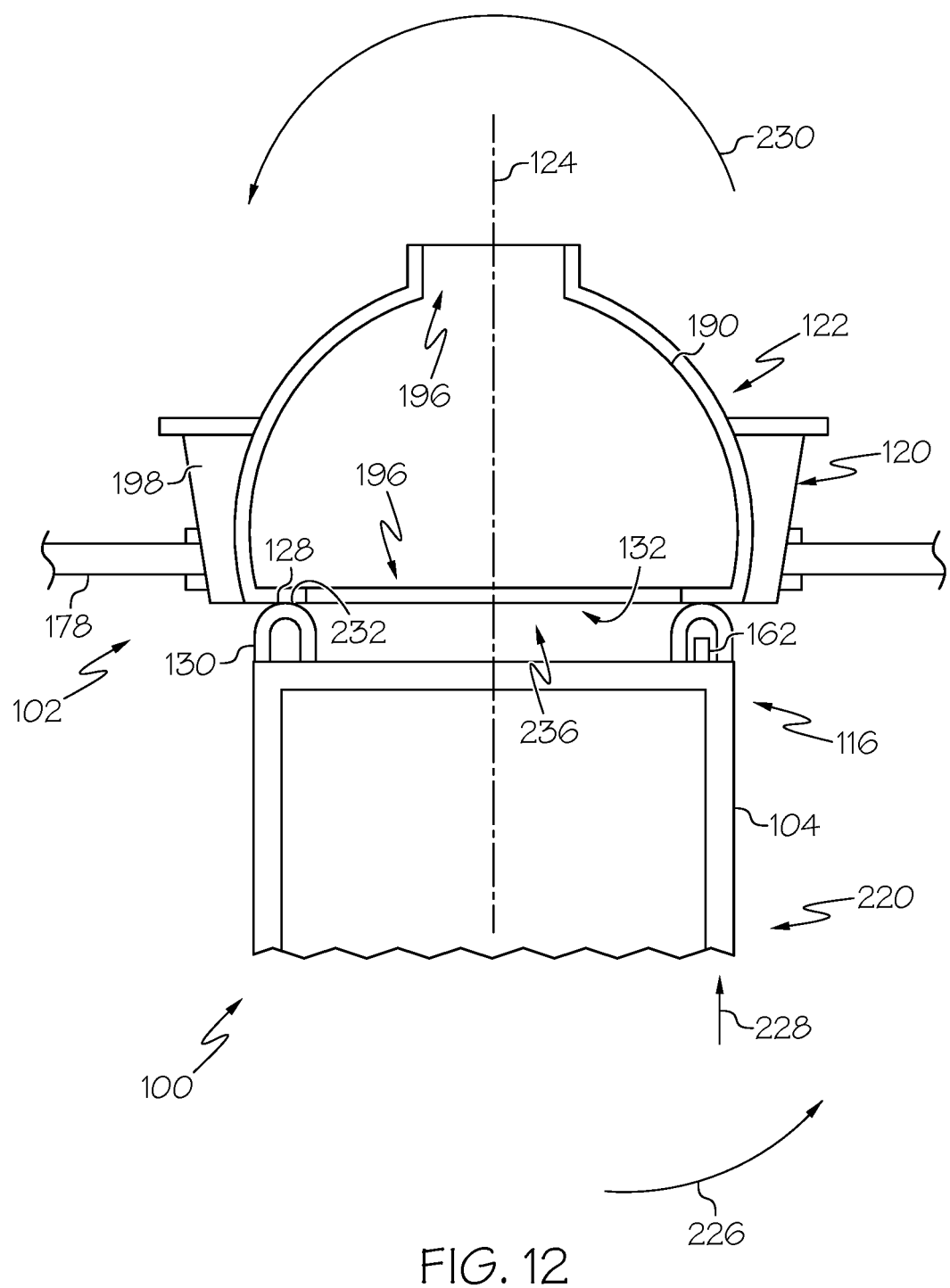
FIG. 12 is a schematic partial side section view of another example of the apparatus of FIG. 9 engaged with the overhead directional service unit.

FIG. 12 is a schematic side section view of an example of the disclosed apparatus 100 engaged with an example of the overhead directional service unit 102 (e.g., the overhead directional service unit 102 illustrated in FIG. 4). In an example, with the first end 116 of the body 104 matingly engaged with the housing assembly 122 of the overhead directional service unit 102 to be locationally aimed, pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114 (FIGS. 18B-18D).

As used herein, the terms "locational aiming," "locationally aimed" and similar terms and phrases mean that the overhead directional service unit 102 is directed, or aimed, at a predetermined location. As an example, the overhead directional service unit 102 is locationally aimed when the housing assembly 122 is positioned at a pivotal, or rotational, orientation about the pivot axis 124 relative to the mounting assembly 120 such that the service outlet 132 of the housing assembly 122, or the functional service output provided by the overhead directional service unit 102, is directed, or aimed, toward a direction of or at a predetermined location relative to the overhead directional service unit 102.

In an example, the body 104 has a length suitable to exert a sufficient leverage force, applied by the hand of the user, upon the housing assembly 122 to pivotally move the housing assembly 122 about the pivot axis 124 relative to the mounting assembly 120.

In an example, the aiming device 220 also includes contact interface 130 configured to interface with the overhead directional service unit 102. In an example, the contact interface 130 is disposed at the first end 116 of the body 104 and extends from the body 104 along the longitudinal axis 108 of the body 104. In an example, the contact interface 130 may be positioned proximate to and run along a periphery of the first end 116 of the body 104 and defines an open space 236.

The contact interface 130 includes an end face 232. The end face 232 is perpendicular to the longitudinal axis 108 of the body 104 and is configured to come into mating contact with a contact surface 128 of the housing assembly 122. In an example, the contact surface 128 of the housing assembly 122 is concentric with the service outlet 132 of the housing assembly 122 (e.g., FIGS. 3, 4 and 12). As used herein, the term "concentric" refers to any shapes that share a common center and where a larger shape surrounds a smaller shape. As an example, the contact surface 128 of the housing assembly 122 substantially (e.g., completely) surrounds the service outlet 132 of the housing assembly 122, regardless of the shape (e.g., in end view) of the contact surface 128 and/or the service outlet 132. Therefore, as used herein, concentric is not limited to circular shapes.

With the first end 116 of the body 104 matingly engaged with the housing assembly 122 of the overhead directional service unit 102, the contact interface 130, and the end face 232 in contact with the contact surface 128 of the housing assembly 122, circumscribe or otherwise surround (e.g., is positioned outside of and around a periphery of) the service outlet 132 so that the service outlet 132 is positioned within the open space 236. In this manner, the contact interface 130 spaces the body 104 away from the functional components of the overhead directional service unit 102 disposed proximate to the lower end of the housing assembly 122, whether the overhead directional service unit 102 is used as the reading light 166 (FIGS. 5 and 6) or the personal air outlet 168 (FIGS. 7 and 8).

As an example, and as illustrated in FIG. 3, the contact surface 128 of the housing assembly 122 may be an end surface 138 of the outlet extension 136 forming a lower periphery of the interior channel 202 of the outlet extension 136 (e.g., a periphery of the second opening 196 of the ball housing 190). For example, the contact surface 128 may form a rim 234 of the outlet extension 136 defining the service outlet 132.

As another example, and as illustrated in FIG. 4, the contact surface 128 of the housing assembly 122 may be an end surface 270 of the ball housing 190 forming a periphery of the second opening 196 of the ball housing 190. For example, the contact surface 128 may form a rim 272 of the ball housing 190 defining the service outlet 132.

In an example, the contact interface 130, and the end face 232, may be suitably sized and shaped, in end view, to match the size and shape, in end view, of the contact surface 128 of the housing assembly 122 and the periphery shape of the service outlet 132 (e.g., the second opening 196 of the ball housing 190). As an example, the contact interface 130 and the end face 232 may have a circular or elliptical shape, in end view, (e.g., an annular contact interface 130 having an annular end face 232) suitable to mate with a circular or elliptical, in end view, contact surface 128 (e.g., an annular contact surface 128). A common design of the examples of the overhead directional service unit 102 may include an annular service outlet 132 (e.g., second opening 196) and/or an annular outlet extension 136 forming an annular contact surface 128. Other shapes, in end view, for the contact interface 130 and the end face 232 configured to match other shapes of the service outlet 132 (e.g., second opening 196), the outlet extension 136 and/or the contact surface 128 are also contemplated.

In an example, the contact interface 130 of the body 104 may be formed from a soft and/or pliable material configured to comply with any contours of the contact surface 128 of the housing assembly 122. As examples, the contact interface 130 may be formed from plastic, rubber, foam, or similar material. Further, at least the end face 232 of the contact interface 130 is formed from a material configured to increase friction between the contact interface 130 and the contact surface 128 while not damaging (e.g., scratching, marring, scoring, contaminating, leaving residue or otherwise marking) the contact surface 128, an exterior surface of the overhead directional service unit 102 or a surface of the service panel 178 or cabin of the aircraft. As examples, the end face 232 may be formed from plastic, rubber, foam, or similar material.

Figure 13:
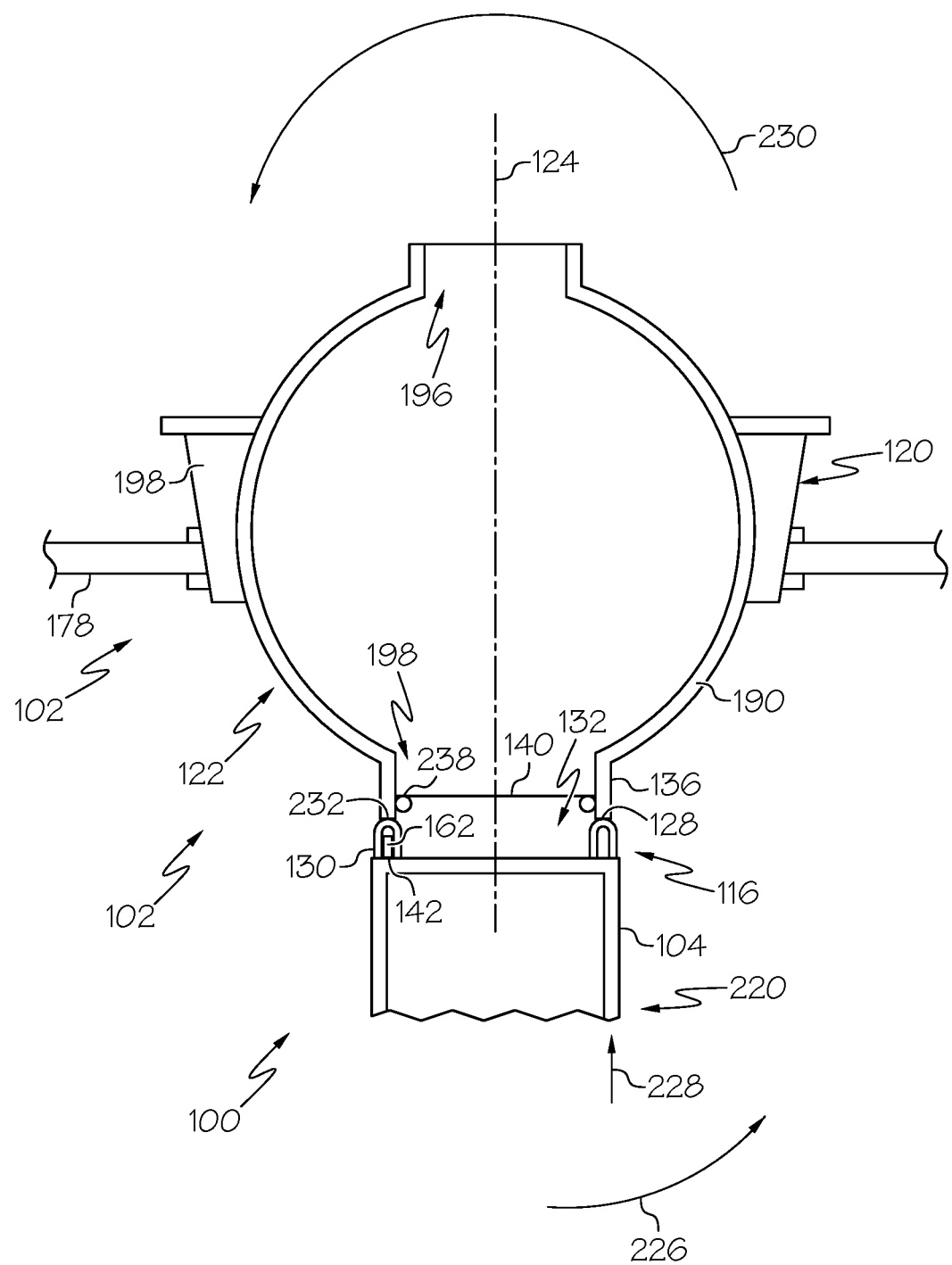
FIG. 13 is a schematic partial side section view of another example of the apparatus of FIG. 9 engaged with the overhead directional service unit.

FIG. 13 is a schematic side section view of another example of the disclosed apparatus 100 engaged with another example of the overhead directional service unit 102 (e.g., the overhead directional service unit 102 illustrated in FIG. 3). In an example, the aiming device 220 includes an insert member 140 disposed at the first end 116 of the body 104. The insert member 140 is configured to be inserted within the outlet extension 136 (e.g., positioned at least partially within the interior channel 202 of the outlet extension 136) of the housing assembly 122 that defines the service outlet 132 of the housing assembly 122. In an example, the insert member 140 may also include a gasket 238 disposed around an exterior surface of the insert member 140 and configured to form an interference fit between the insert member 140 and an interior surface of the outlet extension 136.

In an example, the body 104 also includes a shoulder 142 that extends perpendicularly outward from the insert member 140. In an example, the shoulder 142 defines or includes the contact interface 130, having the end face 232, that is configured to come into mating contact with the contact surface 128 of the outlet extension 136 that is concentric with the service outlet 132 of the housing assembly 122.

With the insert member 140 of the body 104 matingly inserted within the outlet extension 136 of the housing assembly 122 of the overhead directional service unit 102, the contact interface 130, and the end face 232 in contact with the contact surface 128 of the housing assembly 122, circumscribe or otherwise surround the service outlet 132 and an end of the insert member 140 is spaced away from the functional components of the overhead directional service unit 102 disposed proximate to the second opening 196. Pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114 (FIGS. 18B-18D).

In an example, the insert member 140 may be suitably sized and shaped to match and be inserted within the outlet extension 136. As an example, the insert member 140 may have a circular or elliptical shape, in cross-section, suitable to mate within a circular or elliptical, in end view, interior channel 202 of the outlet extension 136. A common design of the examples of the overhead directional service unit 102 may include an annular (e.g., circular in cross-section) outlet extension 136. Other shapes for the insert member 140 configured to match other shapes of the outlet extension 136 are also contemplated.

Figure 14:
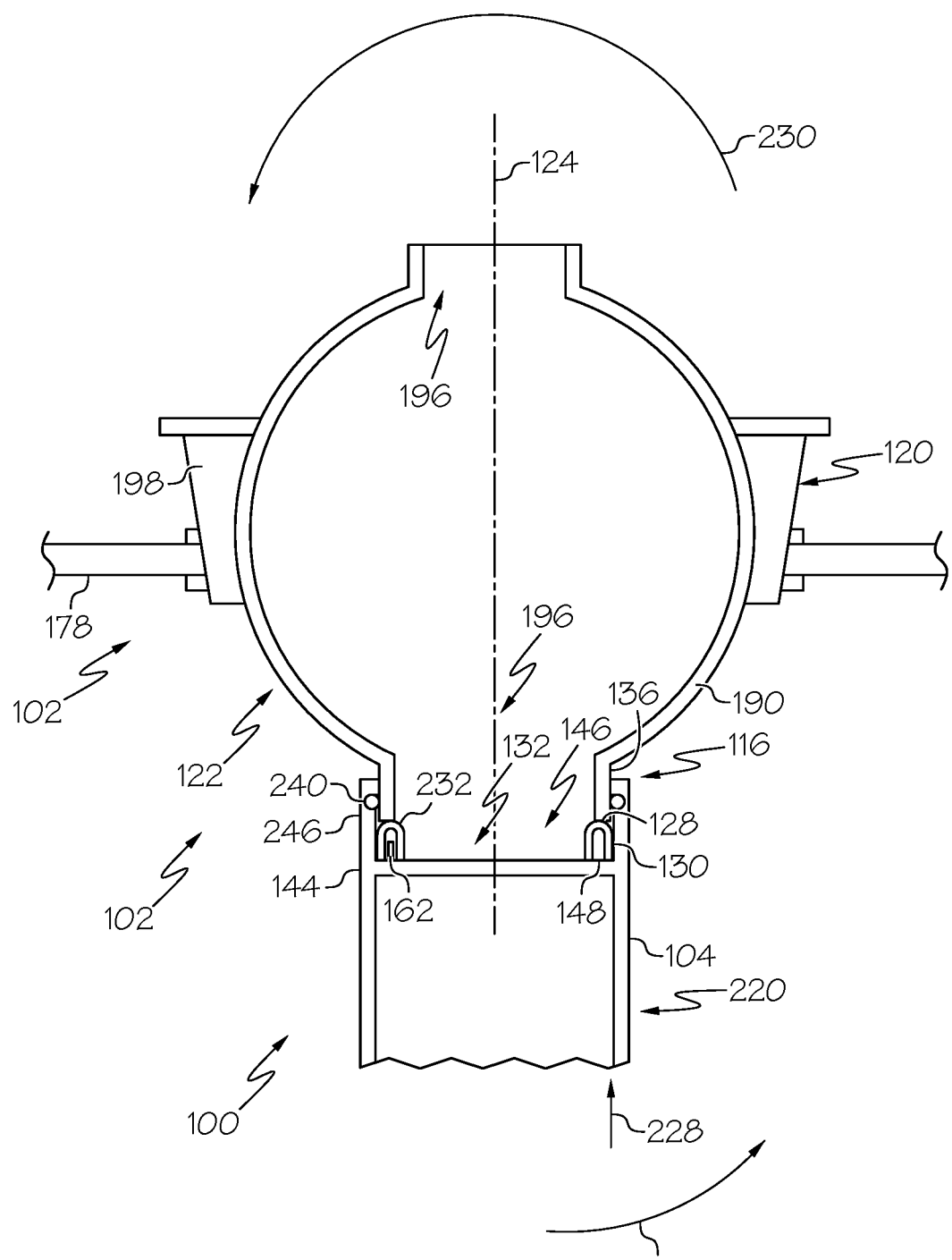
FIG. 14 is a schematic partial side section view of another example of the apparatus of FIG. 9 engaged with the overhead directional service unit.

FIG. 14 is a schematic partial side section view of another example of the disclosed apparatus 100 engaged with another example of the overhead directional service unit 102 (e.g., the overhead directional service unit 102 illustrated in FIG. 3). In an example, the aiming device 220 includes a receiver member 144 disposed at the first end 116 of the body 104. The receiver member 144 includes a sidewall 246 (e.g., a continuous sidewall) forming an opening 146 configured to receive the outlet extension 136 of the housing assembly 122. The outlet extension 136 defines the service outlet 132 of the housing assembly 122. In an example, the receiver member 144 may also include a gasket 240 disposed around an interior surface of the sidewall 246 (e.g., within the opening 146) and configured to form an interference fit between the receiver member 144 and an exterior surface of the outlet extension 136.

In an example, the body 104 also includes a shoulder 148 extending perpendicularly inward from the sidewall 246 of the receiver member 144 into the opening 146. In an example, the shoulder 148 defines or includes the contact interface 130, having the end face 232, that is configured to come into mating contact with the contact surface 128 of the outlet extension 136. The contact surface 128 is concentric with the service outlet 132 of the housing assembly 122.

With the receiver member 144 of the body 104 having matingly received the outlet extension 136 of the housing assembly 122 of the overhead directional service unit 102, the contact interface 130, and the end face 232 in contact with the contact surface 128 of the housing assembly 122, circumscribe or otherwise surround the service outlet 132 and a lower end of the receiver member 144 is spaced away from the functional components of the overhead directional service unit 102 disposed proximate to the second opening 196. Pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114.

In an example, the receiver member 144, and the opening 146, may be suitably sized and shaped to match and receive the outlet extension 136. As an example, the receiver member 144, and the opening 146, may have a circular or elliptical shape, in cross-section, suitable to mate with a circular or elliptical, in end view, outlet extension 136 (e.g., an annular receiver member 144). Other shapes for the receiver member 144, and the opening 146, configured to match other shapes of the outlet extension 136 are also contemplated.

Figure 15:
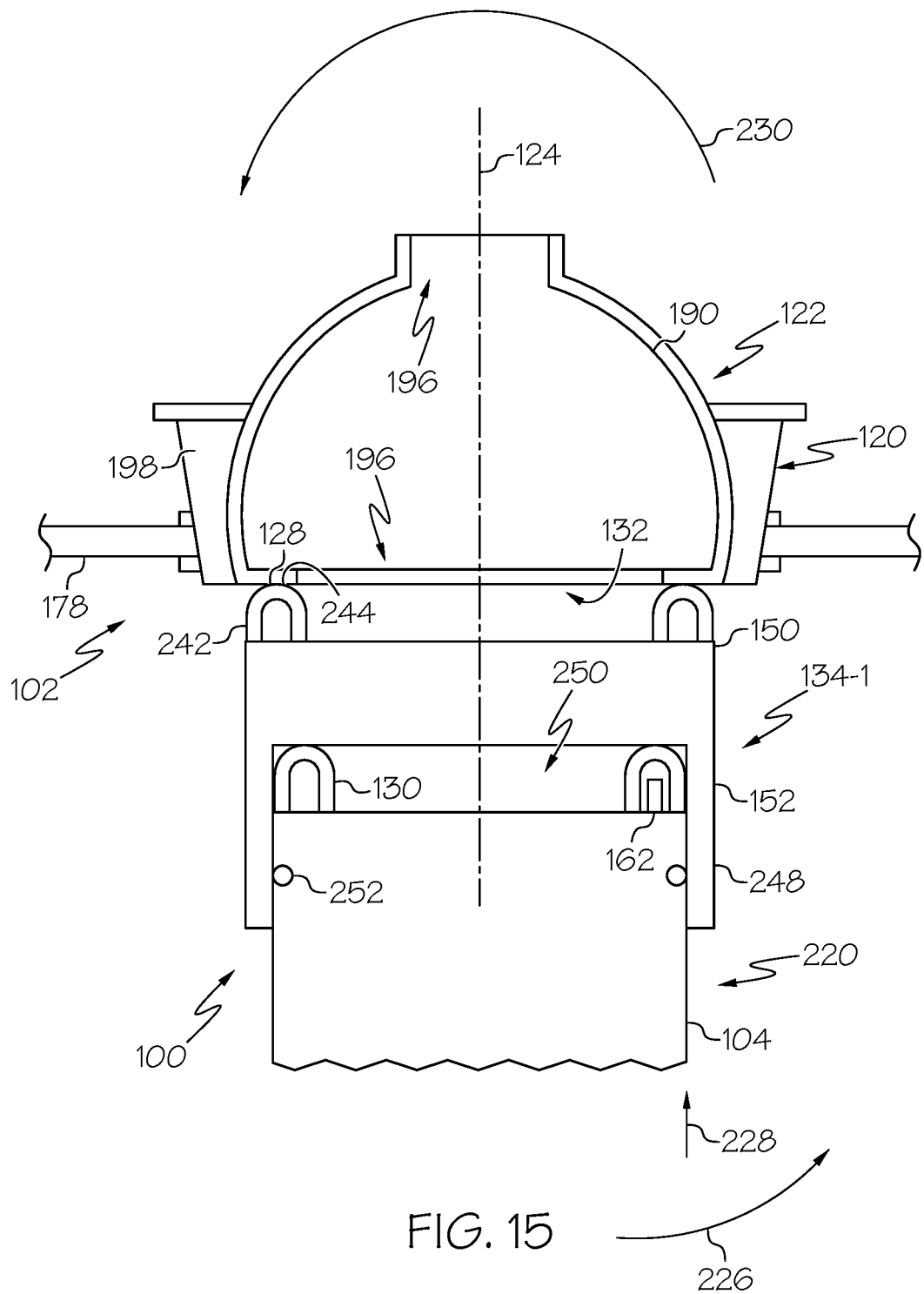
FIG. 15 is a schematic partial side section view of another example of the apparatus of FIG. 9 engaged with the overhead directional service unit.
Figure 16:
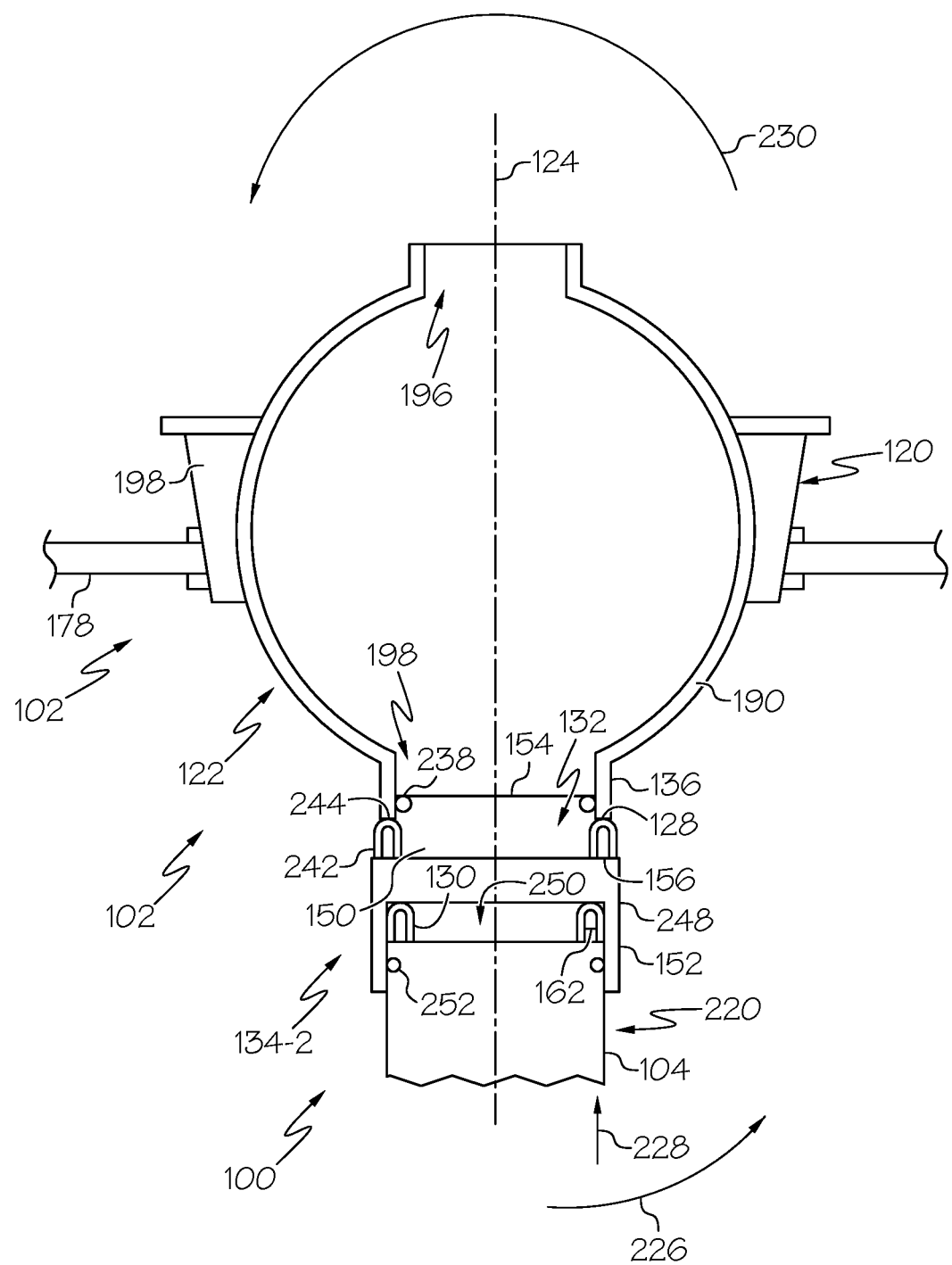
FIG. 16 is a schematic partial side section view of another example of the apparatus of FIG. 9 engaged with the overhead directional service unit.
Figure 17:
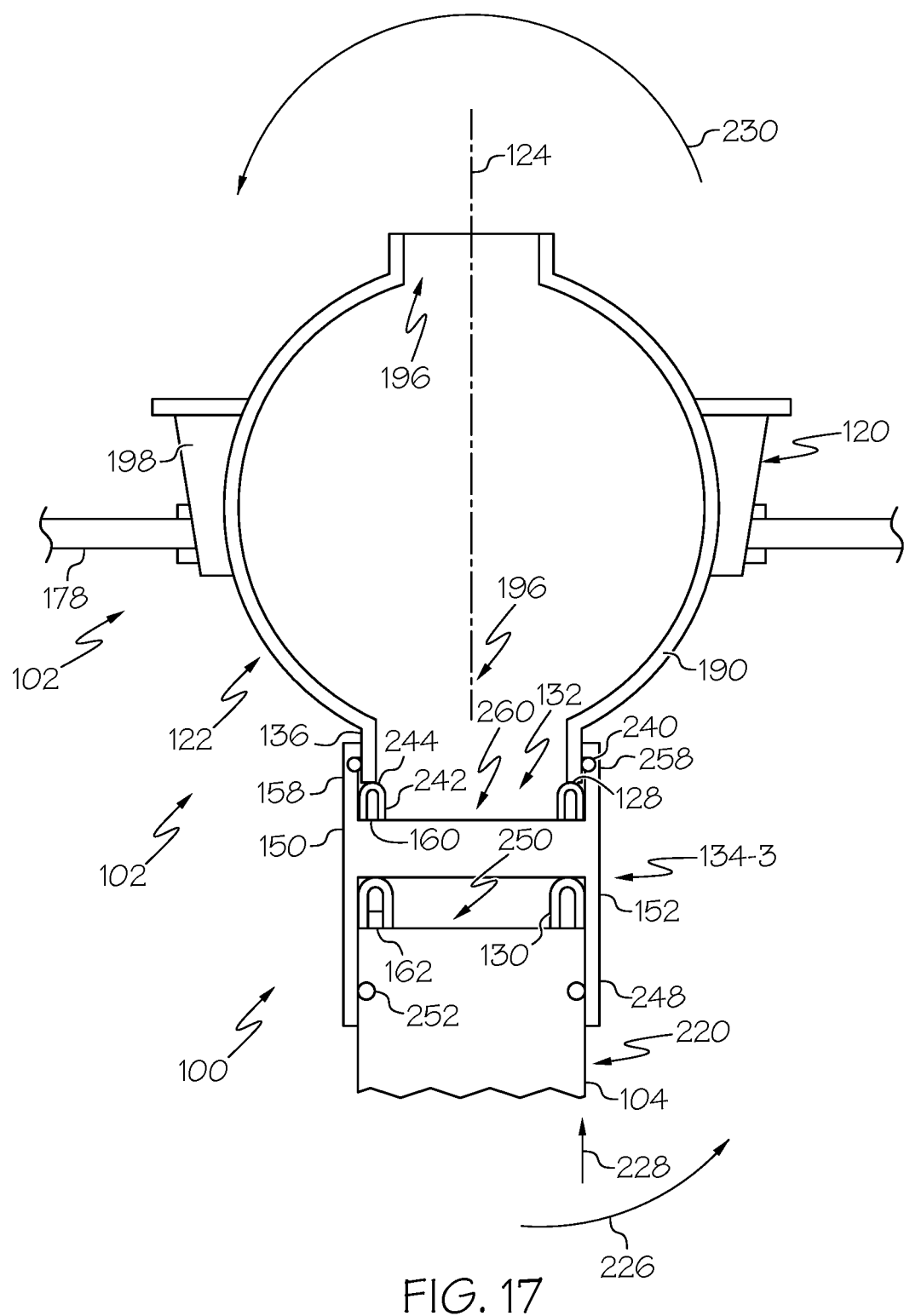
FIG. 17 is a schematic partial side section view of another example of the apparatus of FIG. 9 engaged with the overhead directional service unit.

FIGS. 15-17 are schematic partial side section views of other examples of the disclosed apparatus 100 used with examples of the adapter 134 engaged between the first end 116 of the body 104 of the aiming device 220 and the overhead directional service unit 102. As mentioned above, the adapter 134 may be used as a connection interface and enables the aiming device 220 to be coupled with the housing assembly 122 when the aiming device 220 cannot be directly coupled with the overhead directional service unit 102, for example, due to the size, shape, style, design or type of overhead directional service unit 102. Providing adapters 134 having various sizes, shapes, and/or configurations enables the same aiming device 220 to be used with many different styles of overhead directional service units 102.

In an example, the adapter 134 also includes a body interface 152. The body interface 152 is configured to be releasably coupled with the body 104 of the aiming device 220. In an example, the body interface 152 includes a continuous sidewall 248 forming an opening 250 configured to receive the first end 116 of the body 104. The body interface 152 may also include a gasket 252 disposed around an interior surface of the sidewall 248 (e.g., within the opening 146) and configured to form an interference fit between an interior surface of the sidewall 248 of the body interface 152 and an exterior surface of the body 104 of the aiming device 220. Optionally, the exterior surface of the body 104 may include a groove 254 (FIG. 9) disposed proximate to the first end 116 and configured to accept the gasket 252 when the adapter 134 is coupled with the body 104.

In an example, the adapter 134 also includes a housing assembly interface 150 coupled with the body interface 152. The housing assembly interface 150 is configured to match the particular style of the overhead directional service unit 102 to be locationally aimed. With the adapter 134 coupled with the body 104 of the aiming device 220, the housing assembly interface 150 is configured to interface with the housing assembly 122 during locational aiming of the overhead directional service unit 102.

In an example, the housing assembly interface 150 of the adapter 134 includes a contact interface 242 configured to interface with the overhead directional service unit 102. The contact interface 130 includes an end face 244 disposed perpendicular to the longitudinal axis 108 of the body 104 and configured to come into mating contact with the contact surface 128 of the housing assembly 122. The contact interface 242 and the end face 244 may be substantially the same as the contact interface 130 of the body 104 and the end face 232 of the contact interface 130 described above (e.g., FIGS. 9-14).

As illustrated in FIG. 15, in an example of the adapter 134, referenced herein as a first adapter 134-1, the housing assembly interface 150 includes the contact interface 242 having the end face 244 configured to be matingly engaged with the housing assembly 122. The first adapter 134-1 is configured to for use when the contact surface 128 of the housing assembly 122 of the overhead directional service unit 102 has a size and/or shape differing from the size and/or shape of the contact interface 130 of the aiming device 220.

As an example, with the first end 116 of the body 104 matingly engaged with the body interface 152 of the first adapter 134-1 and the housing assembly interface 150 matingly engaged with the housing assembly 122 of the overhead directional service unit 102, the contact interface 242 of the first adapter 134-1, and the end face 244 in contact with the contact surface 128 of the housing assembly 122, circumscribe or otherwise surround the service outlet 132 so that the service outlet 132 is positioned within an open space 256 defined by the contact interface 242. Pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114.

As illustrated in FIG. 16, in another example of the adapter 134, referenced herein as a second adapter 134-2, the housing assembly interface 150 includes an insert member 154. The insert member 154 is configured to be inserted within the outlet extension 136 (e.g., positioned at least partially within the interior channel 202 of the outlet extension 136) of the housing assembly 122 that defines the service outlet 132 of the housing assembly 122. In an example, the insert member 54 may also include a gasket 238 disposed around an exterior surface of the insert member 140 and configured to form an interference fit between the insert member 154 and an interior surface of the outlet extension 136.

In an example, the housing assembly interface 150 also includes a shoulder 156 that extends perpendicularly outward from the insert member 154. In an example, the shoulder 156 defines or includes the contact interface 242, having the end face 244, that is configured to come into mating contact with the contact surface 128 of the outlet extension 136. The contact surface 128 is concentric with the service outlet 132 of the housing assembly 122.

In an example, with the first end 116 of the body 104 matingly engaged with the body interface 152 of the first adapter 134-1 and the insert member 154 of the second adapter 134-2 matingly inserted within the outlet extension 136 of the housing assembly 122 of the overhead directional service unit 102, the contact interface 242, and the end face 244 in contact with the contact surface 128 of the housing assembly 122, circumscribe or otherwise surround the service outlet 132 and an end of the insert member 154 is spaced away from the functional components of the overhead directional service unit 102 disposed proximate to the second opening 196. Pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114.

As illustrated in FIG. 17, in another example of the adapter 134, referenced herein as a third adapter 134-3, the housing assembly interface 150 includes a receiver member 158. The receiver member 158 includes a sidewall 258 (e.g., a continuous sidewall) forming an opening 260 configured to receive the outlet extension 136 of the housing assembly 122 that defines the service outlet 132 of the housing assembly 122. In an example, the receiver member 158 may also include a gasket 240 disposed around an interior surface of the sidewall 258 (e.g., within the opening 260) and configured to form an interference fit between the receiver member 158 and an exterior surface of the outlet extension 136.

In an example, the housing assembly interface 150 also includes a shoulder 160 extending perpendicularly inward from the sidewall 258 of the receiver member 158 into the opening 260. In an example, the shoulder 160 defines or includes the contact interface 242, having the end face 244, that is configured to come into mating contact with the contact surface 128 of the outlet extension 136. The contact surface 128 is concentric with the service outlet 132 of the housing assembly 122.

In an example, with the first end 116 of the body 104 matingly engaged with the body interface 152 of the first adapter 134-1 and the receiver member 158 of the third adapter 134-3 having matingly received the outlet extension 136 of the housing assembly 122 of the overhead directional service unit 102, the contact interface 242, and the end face 244 in contact with the contact surface 128 of the housing assembly 122, circumscribe or otherwise surround the service outlet 132 and a lower end of the receiver member 158 is spaced away from the functional components of the overhead directional service unit 102 disposed proximate to the second opening 196. Pivotal movement of the body 104 about the pivot axis 124 of the overhead directional service unit 102 (indicated by directional arrow 226) relative to the mounting assembly 120 applies a leverage force (indicated by arrow 228) to the housing assembly 122 sufficient to pivotally move (e.g., reposition) the housing assembly 122 about the pivot axis 124 (indicated by directional arrow 230) relative to the mounting assembly 120 so that the housing assembly 122 is directionally aimed toward the target location 126 visually indicated by the light beam 114.

Referring to FIGS. 9-17, the switch 216 may include a switching element in electrical communication with the power source 110 and the light source 112 and configured to energize the light source 112 upon actuation of the switch 216. In an example, the switch 216 includes a normally open (N.O.) switch 162 (e.g., FIGS. 12-17) so that the aiming device 220 projects the light beam 114 (FIGS. 18B-18D) only while the N.O. switch 162 is actively engaged by the user (e.g., only while a push-button is engaged). Use of the N.O. switch 162 may provide a beneficial safety feature that prevents the light source 112 from being unintentionally left in an energized state. Other types of switching elements, such as a changeover switch, are also contemplated.

In an example, the switch 216 may be configured to be actuated only in response to the body 104 of the aiming device 220 being engaged with the overhead directional service unit 102. As an example, the N.O. switch 162 may be positioned at the first end 116 of the body 104 of the aiming device 220 so that pressure applied to the contact interface 130, such as between the contact interface 130 and the contact surface 128 (e.g., FIGS. 12-14) or between the contact interface 130 and an interior surface of the body interface 152 of the adapter 134 (e.g., FIGS. 15-17) actuates the N.O. switch 162. As an example, the N.O. switch 162 may be mounted to the first end 116 of the body 104 (e.g., within a groove disposed in the first end 116) inside of the contact interface 130 behind the end face 232 so that compression of the contact interface 130 actuates the N.O. switch 162. Use of the N.O. switch 162 in this manner may provide a beneficial feature that prevents the light source 112 from being energized unless the apparatus 100 is in use to locationally aim the overhead directional service unit 102. This may be particularly beneficial when the light source 112 is the laser module 170.

FIGS. 18A-18D illustrate various different example positions of the overhead directional service unit 102 and target locations 126 during a locational aiming operation using the disclosed apparatus 100. An example implementation for locational aiming of the overhead directional service unit 102 using the disclosed apparatus 100 includes, with the aiming device 220 matingly engaged with the overhead directional service unit 102 to be locationally aimed (e.g., either directly or via the adapter 134), pivotally moving the apparatus 100 about the pivot axis 124 to apply the leverage force to overhead directional service unit 102 and to pivotally reposition the overhead directional service unit 102 so that the overhead directional service unit 102 is directionally aimed toward the target location 126 visually indicated by the light beam 114.

Figure 18A:
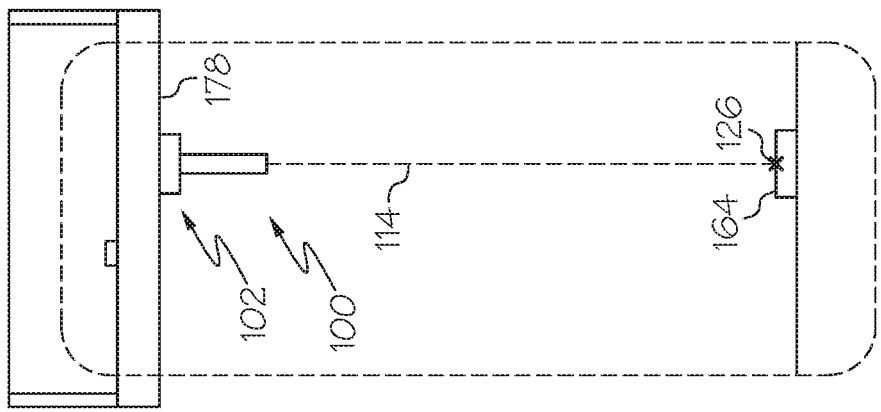

As illustrated in FIG. 18A, the overhead directional service unit 102 may not initially be directed toward an appropriate location (e.g., the direction of the service outlet 132 based on the pivotal orientation of the housing assembly 122 about the pivot axis 124 relative to the mounting assembly 120) (FIGS. 3 and 4). As illustrated in FIGS. 18B-D, the apparatus 100 may be used to locationally aim the overhead directional service unit 102 by applying the leverage force to the overhead directional service unit 102 to directionally reposition (e.g., pivot or rotate) the overhead directional service unit 102 so that the functional service output is directed, or aimed, at the target location 126 as visually indicated by positioning a spot of the light beam 114 proximate to the target location. As illustrated in FIG. 18B, in an example, the target location 126 may be disposed on the seat associated with the overhead directional service unit 102. As illustrated in FIG. 18C, in another example, the target location 126 may be disposed on the tray table forward of the seat associated with the overhead directional service unit 102. As illustrated in FIG. 18D, in another example, the target location 126 may be disposed on the floor panel of an uninstalled seat associated with the overhead directional service unit 102.

Figure 19:
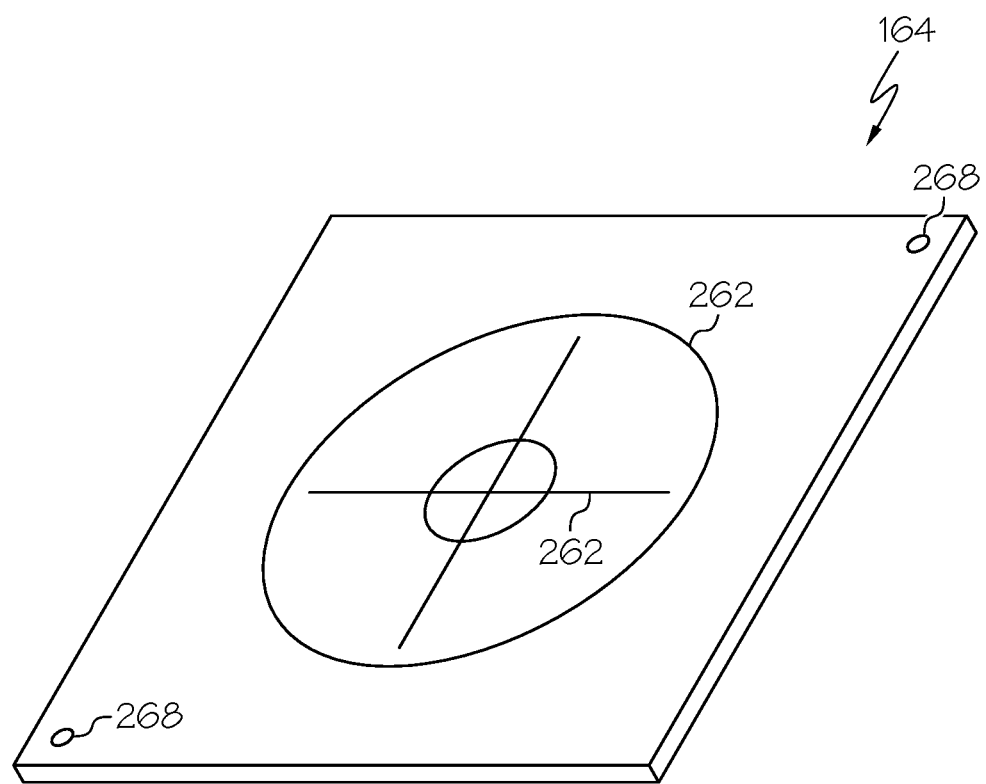
FIG. 19 is a schematic perspective view of an example target placard.

Referring to FIG. 19, in an example, the apparatus 100 may also include a target placard 164. The target placard 164 may be used when the target location 126 is not available (e.g., when target location is a seat that has not been installed) or when the target location 126 is obscured by another structure of the interior of the cabin of the aircraft. During use, the target placard 164 may be positioned at a predetermined location representative of the target location 126. The target placard 164 may include one or more target images 262 (e.g., concentric circular target images, crosshair target images and the like). The target image 262 may be configured based, at least in part, on the required precision of the locational aiming requirement of the overhead directional service unit 102. The target placard 164 may also include one or more indexing images 268 located relative to the target image 262 and configured to allow the target placard 164 to be quickly and accurately located relative to another structure of the interior of the aircraft. In another example, a surface of the target placard 164 may be configured to reflect or otherwise react to the light beam 114, for example, to provide increased visual recognition of the location of the spot of the light beam 114 on the surface of the target placard 164.

Referring back to FIG. 9, in an example, the lens 222 of the aiming device 220 may be configured to convert the light beam 114 into a preselected shape or pattern when projected onto the target location 126. As examples, the preselected shape or pattern of the light beam 114 may include a crosshair, a circle, a line, and the like.

Alternatively, in another example, the apparatus 100 may also include at least one pattern attachment 264. The pattern attachment 264 is configured to be removably coupled with the second end 118 of the body 104 of the aiming device 220. In an example, the pattern attachment 264 includes a lens 266 configured to convert the light beam 114 into a preselected shape or pattern when projected onto the target location 126. As examples, the preselected shape or pattern of the light beam 114 may include a crosshair, a circle, a line, and the like.

Figure 20:
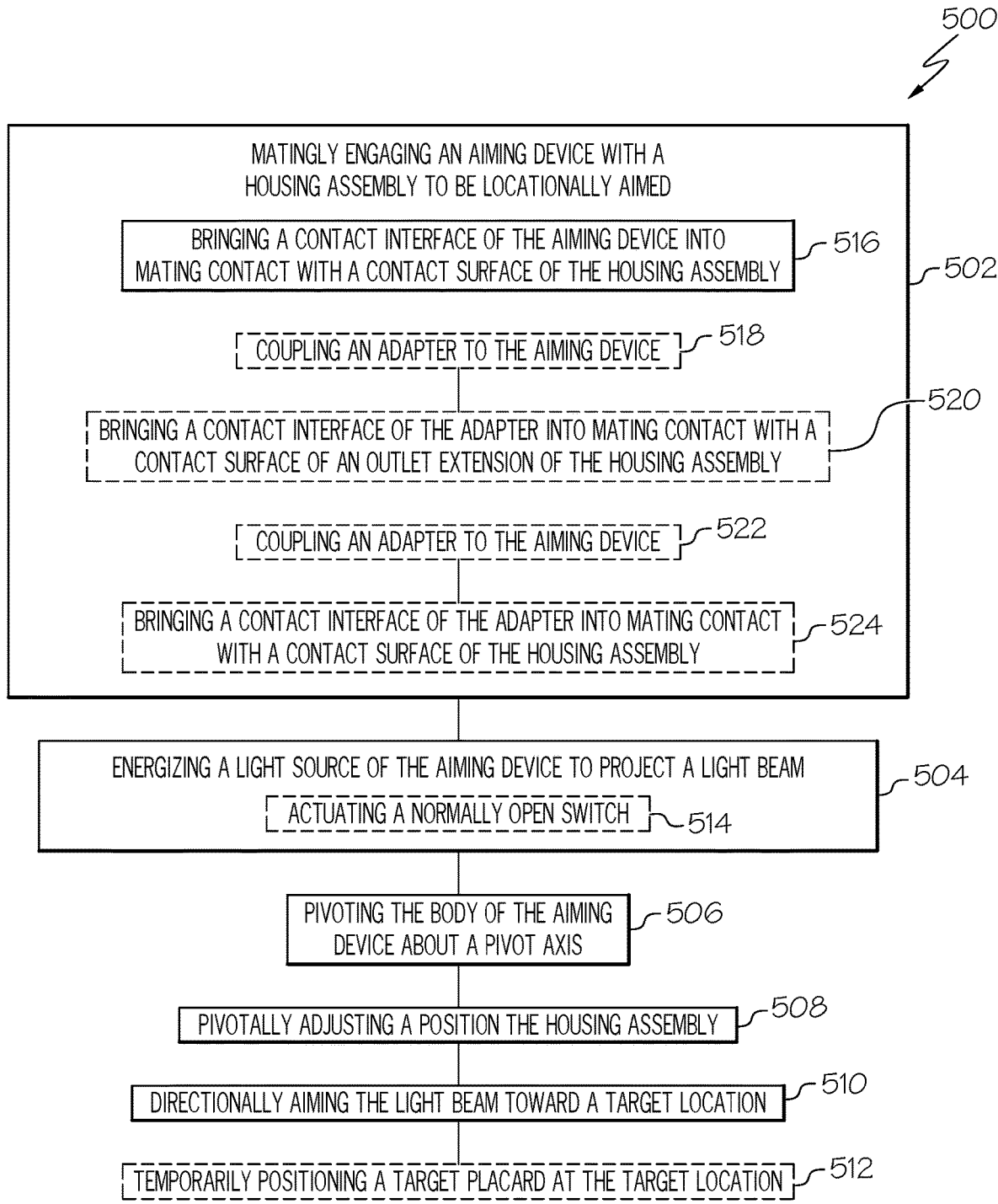
FIG. 20 is a flow diagram of an example of the disclosed method for locational aiming of the overhead directional service unit.

FIG. 20 is a flow diagram of an example of the disclosed method 500 for locational aiming of the overhead directional service unit 102 using the disclosed apparatus 100. As shown at block 502, the method 500 may begin by matingly engaging the first end 116 of the body 104 of the aiming device 220 with the housing assembly 122 of the overhead directional service unit 102 to be locationally aimed. As shown at block 504, the light source 112 of the aiming device 220, disposed within the interior chamber 106 of the body 104, is energized to project the light beam 114 from the second end of the body 104. As shown at block 506, with the first end 116 of the body 104 of the aiming device 220 matingly engaged with the housing assembly 122, the body 104 of the aiming device 220 is pivoted about the pivot axis 124 of the overhead directional service unit 102 relative to the mounting assembly 120. As shown at block 508, a position of the housing assembly 122 relative to the mounting assembly 120 is pivotally adjusted by applying the leverage force to the housing assembly 122 with the body 104 of the aiming device 220. As shown at block 510, the light beam 114 is directionally aimed toward the target location 126 to pivotally position the housing assembly 122 at a predetermined pivotal position so that the service outlet 132 of the housing assembly 122 is locationally aimed at the target location 126.

As shown at block 512, the method 500 may also include temporarily positioning the target placard 164 at the target location 126, wherein the operational step of directionally aiming the light beam 114 toward the target location 126 includes directionally aiming the light beam 114 onto the target placard.

As shown at block 514, in an example, the operational step of energizing the light source 112 of the aiming device 220 includes actuating the normally open switch 162 upon mating engagement of the first end 116 of the body 104 of the aiming device 220 with the housing assembly 122.

As shown at block 516, in an example, the operational step of matingly engaging the first end 116 of the body 104 of the aiming device 220 with the housing assembly 122 of the overhead directional service unit 102 to be locationally aimed includes bringing the contact interface 130 of the first end 116 of the body 104 of the aiming device 220 into mating contact with the contact surface 128 of the housing assembly 122 that is concentric with the service outlet 132 of the housing assembly 122.

As shown at blocks 518 and 520, in another example, the operational step of matingly engaging the first end 116 of the body 104 of the aiming device 220 with the housing assembly 122 of the overhead directional service unit 102 to be locationally aimed includes coupling the adapter 134 to the first end 116 of the body 104 of the aiming device 220 and bringing the contact interface 242 of the adapter 134 into mating contact with the contact surface 128 of the outlet extension 136 that is concentric with the service outlet 132 of the housing assembly 122.

As shown at blocks 522 and 524, in another example, the operational step of matingly engaging the first end 116 of the body 104 of the aiming device 220 with the housing assembly 122 of the overhead directional service unit 102 to be locationally aimed includes coupling the adapter 134 to the first end 116 of the body 104 of the aiming device 220 and bringing the contact interface 242 of the adapter 134 into mating contact with the contact surface 128 of the housing assembly 122 that is concentric with the service outlet 132 of the housing assembly 122.

Examples of the apparatus 100 and method 500 for locational aiming of the overhead directional service unit 102 disclosed herein may find use in a variety of potential applications, particularly in the transportation industry, including for example, aerospace, marine, and automotive applications. Thus, referring now to FIGS. 21 and 22, examples of the apparatus 100 and method 500 may be used in the context of an aircraft manufacturing and service method 1100, as shown in the flow diagram of FIG. 21, and the aircraft 1200, as shown in FIG. 22. Aircraft applications of the disclosed examples may include locational aiming of a plurality of overhead directional service units 102 of passenger service units 176 of the aircraft 1200 prior to certification and delivery to the customer.

Figure 21:
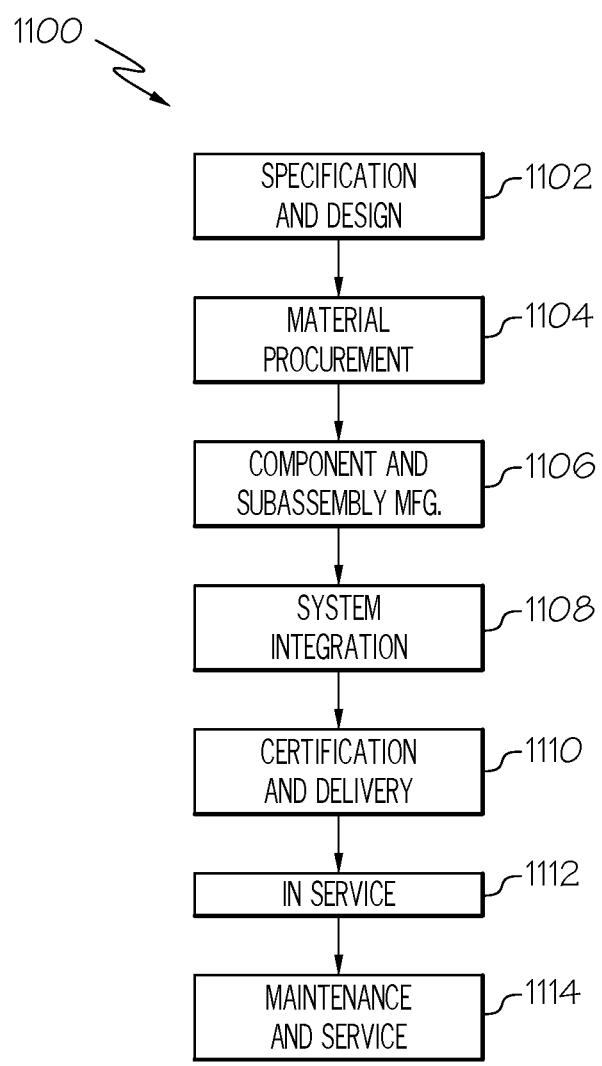
FIG. 21 is a schematic illustration of an aircraft.
Figure 22:
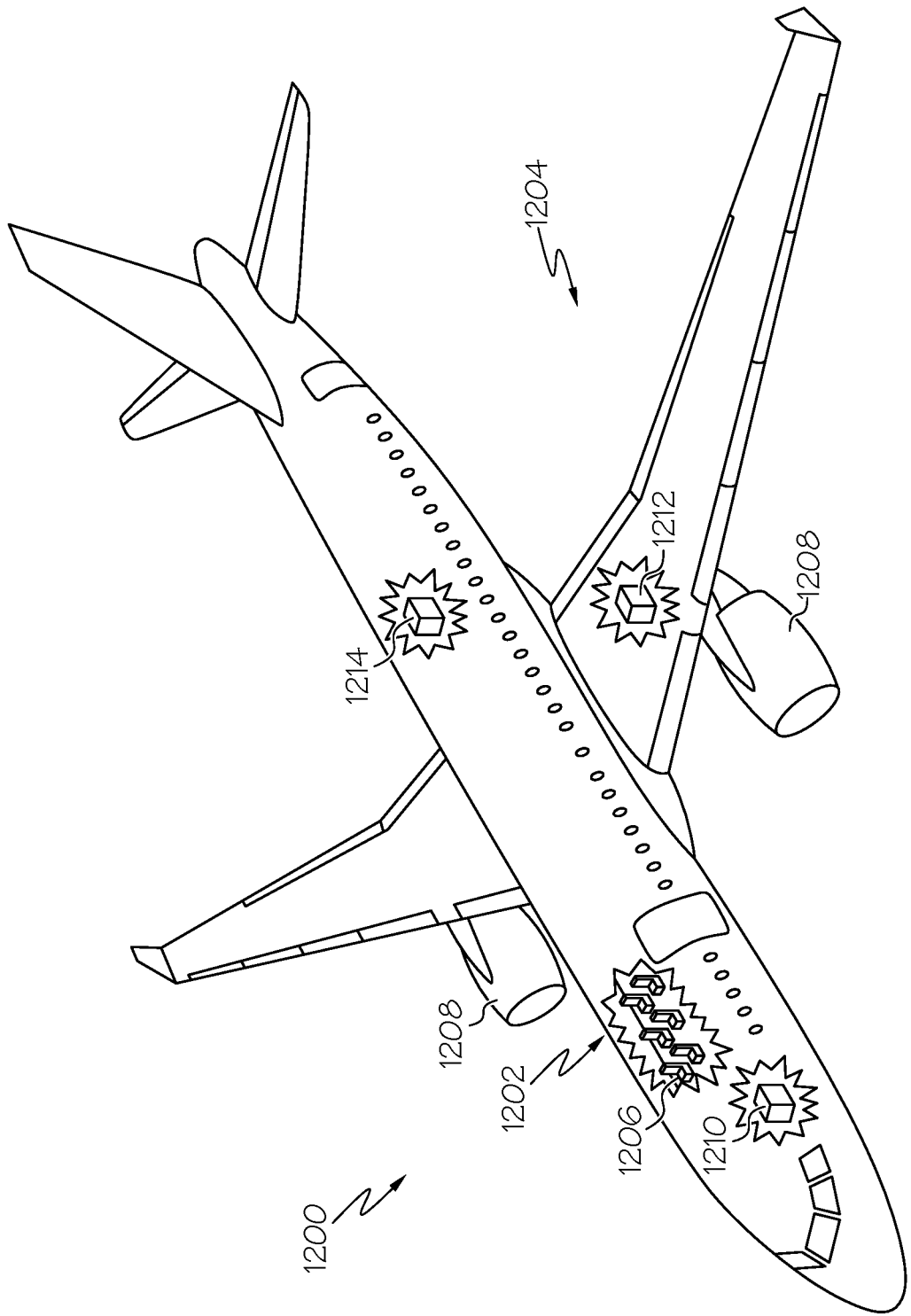
FIG. 22 is a schematic block diagram of aircraft production and service methodology.

As shown in FIG. 21, during pre-production, the illustrative method 1100 may include specification and design, as shown at block 1102, of aircraft 1200 and material procurement, as shown at block 1104. During production, component and subassembly manufacturing, as shown at block 1106, and system integration, as shown at block 1108, of the aircraft 1200 may take place. Thereafter, the aircraft 1200 may go through certification and delivery, as shown block 1110, to be placed in service, as shown at block 1112. Locational aiming of the overhead directional service unit 102 using the disclosed apparatus 100 may be accomplished as a portion of system integration (block 1108) and/or certification and delivery (block 1110). While in service, the aircraft 1200 may be scheduled for routine maintenance and service, as shown at block 1114. Routine maintenance and service may include modification, reconfiguration, refurbishment, etc. of one or more systems of the aircraft 1200.

Each of the processes of illustrative method may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 22, the aircraft 1200 produced by the illustrative method may include an airframe 1202, a plurality of high-level systems 1204 and an interior 1206, for example, that includes passenger service units 176 having a plurality of the overhead directional service units 102. Examples of the high-level systems 1204 include one or more of a propulsion system 1208, an electrical system 1210, a hydraulic system 1212 and an environmental system 1214. Any number of other systems may be included. Although an aerospace example is shown, the principles disclosed herein may be applied to other industries, such as the automotive industry, the marine industry, and the like.

Examples of the apparatuses and methods shown or described herein may be employed during any one or more of the stages of the manufacturing and service method shown in flow diagram 1100. For example, components or subassemblies corresponding to component and subassembly manufacturing (block 1106) may be fabricated or manufactured in a manner similar to components or subassemblies produced while the aircraft 1200 is in service (block 1112). Also, one or more examples of the apparatuses, methods or combination thereof may be utilized during production stages (blocks 1108 and 1110). Similarly, one or more examples of the apparatuses, and methods or a combination thereof, may be utilized, for example and without limitation, while the aircraft 1200 is in service (block 1112) and during maintenance and service stage (block 1114).

Reference herein to "example" means that one or more feature, structure, element, component, characteristic and/or operational step described in connection with the example is included in at least one embodiment and or implementation of the subject matter according to the present disclosure. Thus, the phrases "an example," "another example," and similar language throughout the present disclosure may, but do not necessarily, refer to the same example. Further, the subject matter characterizing any one example may, but does not necessarily, include the subject matter characterizing any other example.

Reference herein to "configured" denotes an actual state of configuration that fundamentally ties the element or feature to the physical characteristics of the element or feature preceding the phrase "configured to".

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

As used herein, the terms "approximately" and "about" represent an amount close to the stated amount that still performs the desired function or achieves the desired result. For example, the terms "approximately" and "about" may refer to an amount that is within less than 10% of, within less than 5% of, within less than 1% of, within less than 0.1% of, and within less than 0.01% of the stated amount.

As used herein, the term "substantially" may include exactly and similar, which is to an extent that it may be perceived as being exact. For illustration purposes only and not as a limiting example, the term "substantially" may be quantified as a variance of +/−5% from the exact or actual. For example, the phrase "A is substantially the same as B" may encompass embodiments where A is exactly the same as B, or where A may be within a variance of +/−5%, for example of a value, of B, or vice versa.

As used herein, the terms "partially" or "at least a portion of" may represent an amount of a whole that includes an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60%, greater than 70% of, greater than 80% of, greater than 90% of, greater than 95% of, greater than 99% of, and 100% of the whole.

In FIG. 22, referred to above, solid lines, if any, connecting various elements and/or components represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the block diagrams may also exist. Dashed lines, if any, connecting blocks designating the various elements and/or components represent couplings similar in function and purpose to those represented by solid lines; however, couplings represented by the dashed lines are either selectively provided or relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIG. 22 may be combined in various ways without the need to include other features described in FIG. 22, other drawing figures, and/or the accompanying disclosure, even though such combination or combinations are not explicitly illustrated herein. Similarly, additional features not limited to the examples presented, may be combined with some or all of the features shown and described herein.

In FIGS. 20 and 21, referred to above, the blocks may represent operations and/or portions thereof and lines connecting the various blocks do not imply any particular order or dependency of the operations or portions thereof. Blocks, if any, represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 20 and 21 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed apparatus and method have been shown and described, modifications may occur to those skilled in the art upon reading the specification. The present application includes such modifications and is limited only by the scope of the claims.

What is claimed is:

1. An apparatus for locational aiming of an overhead directional service unit comprising a mounting assembly and a housing assembly, coupled to said mounting assembly and pivotal about a pivot axis with respect to said mounting assembly, said housing assembly comprising a contact surface that is concentric to a service outlet of said overhead directional service unit, said apparatus comprising:
    a body having an interior chamber and a longitudinal axis, said body comprising:
        a first end configured to be matingly engaged with said housing assembly; and
        a second end longitudinally opposed to said first end;
    a light source disposed within said interior chamber of said body and operable to project a light beam from said second end in a direction defined by said longitudinal axis of said body; and
    a contact interface, comprising:
        a circumferentially open cross-sectional shape;
        sides, coupled to said first end of said body; and
        an end face, extending between said sides,
    wherein said contact interface is configured to be compressed in a direction parallel to said longitudinal axis of said body when said first end of said body is engaged with said housing assembly.

2. The apparatus of claim 1 wherein:
    said contact interface has an annular shape, viewed along the longitudinal axis of said body;
    at least a portion of said end face is disposed perpendicular to said longitudinal axis; and
    said end face is configured to come into mating contact with said contact surface of said housing assembly.

3. The apparatus of claim 2 wherein said body further comprises:
    an insert member disposed at said first end and configured to be inserted within an outlet extension of said housing assembly; and
    a shoulder extending perpendicularly outward from said insert member, and wherein:
    said contact interface is located on said shoulder; and
    said outlet extension defines said service outlet of said overhead directional service unit.

4. The apparatus of claim 2 wherein said body further comprises:
    a receiver member disposed at said first end and having an opening configured to receive an outlet extension of said housing assembly; and
    a shoulder extending perpendicularly inward from said receiver member into said opening, and wherein:
    said contact interface is located on said shoulder; and
    said outlet extension defines said service outlet of said overhead directional service unit.

5. The apparatus of claim 1 further comprising an adapter configured to be removably coupled with said first end of said body and
    further configured to be matingly engaged with said housing assembly.

6. The apparatus of claim 5 wherein:
    said adapter comprises:
        a body interface configured to be releasably coupled with said first end of said body; and
        a second contact interface comprising:
            a circumferentially open cross-sectional shape;
            sides, coupled to said body interface; and
            a second end face, extending between said sides;
        said second end face is configured to come into mating contact with said contact surface of said housing assembly; and
        said second contact interface is configured to be compressed in the direction parallel to said longitudinal axis of said body when said adapter is engaged with said housing assembly.

7. The apparatus of claim 6 wherein said adapter further comprises:
    an insert member coupled to said body interface and configured to be inserted within an outlet extension of said housing assembly; and
    a shoulder extending perpendicularly outward from said insert member, and wherein:
    said second contact interface is located on said shoulder; and
    said outlet extension defines said service outlet of said overhead directional service unit.

8. The apparatus of claim 6 wherein said adapter further comprises:
    a receiver member coupled to said body interface and having an opening configured to receive an outlet extension of said housing assembly; and
    a shoulder extending perpendicularly inward from said receiver member into said opening, and wherein:
    said second contact interface is located on said shoulder; and
    said outlet extension defines said service outlet of said overhead directional service unit.

9. The apparatus of claim 1 further comprising a normally open contact switch located between said body and said end face of said contact interface, and wherein said normally open contact switch is configured to energize said light source in response to compression of said contact interface in the direction parallel to said longitudinal axis of said body when said first end of said body is engaged with said housing assembly.

10. The apparatus of claim 9 wherein said normally open contact switch is spaced away from said sides and said end face of said contact interface.

11. The apparatus of claim 1 further comprising a target placard temporarily positioned relative to said overhead directional service unit to identify a target location.

12. The apparatus of claim 1 wherein said light source comprises:

a power source disposed within said interior chamber of said body; and a laser module disposed within said interior chamber of said body and in electrical communication with said power source.

13. The apparatus of claim 1 wherein:

said light source comprises:
a power source disposed within said interior chamber of said body; and
a light emitting element disposed within said interior chamber of said body and in electrical communication with said power source, and
said body further comprises a focusing assembly configured to move said light emitting element to adjust a focal point of said light beam.

14. A method for locational aiming of an overhead directional service unit comprising a mounting assembly and a housing assembly, coupled to said mounting assembly and pivotal about a pivot axis with respect to said mounting assembly, using said apparatus of claim 1, said method comprising:

with said first end of said body matingly engaged with said housing assembly to be locationally aimed, compressing said contact interface against said contact surface in the direction parallel to said longitudinal axis of said body; and pivotally moving said body about said pivot axis relative to said mounting assembly to apply a leverage force to said housing assembly to pivotally reposition said housing assembly relative to said mounting assembly so that said housing assembly is directionally aimed toward a target location visually indicated by said light beam.

15. A method for locational aiming of an overhead directional service unit comprising a mounting assembly and a housing assembly, coupled to said mounting assembly and pivotal about a pivot axis with respect to said mounting assembly, said housing assembly comprising a contact surface that is concentric to a service outlet of said overhead directional service unit, said method comprising steps of:

matingly engaging a first end of a body of an aiming apparatus with said housing assembly to be locationally aimed;

energizing a light source of said aiming apparatus, disposed within an interior chamber of said body, to project a light beam from a second end of said body;

with said first end of said body of said aiming apparatus matingly engaged with said housing assembly, compressing a contact interface of said aiming apparatus in a direction parallel to a longitudinal axis of said body, said contact interface comprises:
a circumferentially open cross-sectional shape;
sides, coupled to said first end of said body; and
an end face, extending between said sides;

pivotally adjusting a position said housing assembly relative to said mounting assembly in response to a leverage force applied to said housing assembly by said body of said aiming apparatus; and directionally aiming said light beam toward a target location to pivotally position said housing assembly at a predetermined pivotal position so that a service outlet of said overhead directional service unit is locationally aimed at said target location.

16. The method of claim 15 further comprising temporarily positioning a target placard at said target location, wherein said directionally aiming said light beam toward said target location comprises directionally aiming said light beam onto said target placard.

17. The method of claim 15 wherein said energizing said light source of said aiming apparatus comprises actuating a normally open contact switch, located between said body and said end face of said contact interface, in response to compression of said contact interface in the direction parallel to said longitudinal axis of said body.

18. The method of claim 15 wherein:

said contact interface has an annular shape, viewed along the longitudinal axis of said body; and said step of matingly engaging said first end of said body of said aiming apparatus with said housing assembly to be locationally aimed comprises placing said end face of said contact interface into mating contact with said contact surface of said housing assembly.

19. The method of claim 15 wherein:

said step of matingly engaging said first end of said body of said aiming apparatus with said housing assembly to be locationally aimed comprises:

coupling an adapter to said first end of said body of said aiming apparatus, said adapter comprising a body interface and a second contact interface; and placing said second contact interface of said adapter into mating contact with said contact surface of said housing assembly; and said second contact interface comprises:
a circumferentially open cross-sectional shape;
sides, coupled to said body interface; and
a second end face, extending between said sides.

20. The method of claim 15 wherein:

said step of matingly engaging said first end of said body of said aiming apparatus with said housing assembly to be locationally aimed further comprises compressing a gasket, located between said body and an outlet extension of said housing assembly, in a direction perpendicular to said longitudinal axis of said body; and said outlet extension defines said service outlet of said overhead directional service unit.

* * * * *